United States Patent
Suwa et al.

(10) Patent No.: US 10,655,037 B2
(45) Date of Patent: May 19, 2020

(54) ADHESIVE COMPOSITION FOR POLARIZING PLATE, ADHESIVE FILM FOR POLARIZING PLATE COMPRISING THE SAME, POLARIZING PLATE COMPRISING THE SAME AND DISPLAY DEVICE COMPRISING THE SAME

(71) Applicant: SAMSUNG SDI CO., LTD., Yongin-si, Gyeonggi-Do (KR)

(72) Inventors: Tatsuhiro Suwa, Yokohamashi (JP); Hiroshi Ogawa, Yokohamashi (JP)

(73) Assignee: SAMSUNG SDI CO., LTD., Yongin-si (KR)

( * ) Notice: Subject to any disclaimer, the term of this patent is extended or adjusted under 35 U.S.C. 154(b) by 257 days.

(21) Appl. No.: 15/791,117

(22) Filed: Oct. 23, 2017

(65) Prior Publication Data

US 2018/0044563 A1 Feb. 15, 2018

Related U.S. Application Data

(62) Division of application No. 14/326,173, filed on Jul. 8, 2014, now Pat. No. 9,834,708.

(30) Foreign Application Priority Data

| Jul. 8, 2013 | (JP) | ................................ 2013-143028 |
| Jul. 23, 2013 | (JP) | ................................ 2013-152825 |
| Jan. 22, 2014 | (KR) | ......................... 10-2014-0008027 |
| Jan. 22, 2014 | (KR) | ......................... 10-2014-0008028 |

(51) Int. Cl.
| C08F 2/46 | (2006.01) |
| C08F 2/50 | (2006.01) |
| C08G 61/04 | (2006.01) |
| C09J 133/14 | (2006.01) |
| C09J 163/00 | (2006.01) |
| C09J 4/06 | (2006.01) |
| C09J 133/06 | (2006.01) |
| C08L 33/06 | (2006.01) |
| C08L 63/00 | (2006.01) |
| C08F 2/48 | (2006.01) |
| C08F 220/20 | (2006.01) |

(52) U.S. Cl.
CPC ........... *C09J 133/14* (2013.01); *C08L 33/068* (2013.01); *C08L 63/00* (2013.01); *C09J 4/06* (2013.01); *C09J 133/068* (2013.01); *C09J 163/00* (2013.01); *C08F 2/48* (2013.01); *C08F 220/20* (2013.01); *Y10T 428/31515* (2015.04)

(58) Field of Classification Search
CPC .... C09J 133/14; C09J 133/068; C09J 163/00; C09J 4/06; Y10T 428/31515; C08F 220/20; C08F 2/48; C08L 33/068; C08L 63/00

USPC .................. 522/7, 6, 71, 189, 184, 1; 520/1
See application file for complete search history.

(56) References Cited

U.S. PATENT DOCUMENTS

| 2006/0194029 | A1* | 8/2006 | Tsujihata | ............ C08F 290/046 |
| | | | | 428/195.1 |
| 2013/0244041 | A1 | 9/2013 | Cho et al. | |

FOREIGN PATENT DOCUMENTS

| CN | 101845286 A | 9/2010 |
| CN | 102257087 A | 11/2011 |
| CN | 102712832 A | 10/2012 |
| JP | 2-9619 | 3/1990 |
| JP | H10-306140 A | 11/1998 |
| JP | 2002-517541 A | 6/2002 |
| JP | 2008-260879 | 10/2008 |
| JP | 2010-18722 | 1/2010 |
| JP | 2011-76058 | 4/2011 |
| JP | 2012-62471 | 3/2012 |
| JP | 2012-109544 A | 6/2012 |
| JP | 2012-172026 | 9/2012 |
| KR | 2003-0067278 A | 8/2003 |
| KR | 10-2010-0075726 A | 7/2010 |
| KR | 1020100075726 * | 7/2010 |
| KR | 10-2012-0044236 A | 5/2012 |
| WO | WO 2012/039581 A2 | 3/2012 |
| WO | WO 2012/173054 A | 12/2012 |
| WO | WO -2012173054 A1 * | 12/2012 ................ C09J 4/00 |

OTHER PUBLICATIONS

Song et al, KR 1020100075726 Machine Translation, Jul. 5, 2010 (Year: 2010).*
Ofusa, WO 2012173054 Machine Translation, Dec. 20, 2012 (Year: 2012).*
Chinese Office Action, issued in Patent Application No. 201410323092. 7, dated Aug. 27, 2015, 12 pages.
Japan Office action dated Apr. 11, 2017, corresponding to Japanese Patent Application No. 2013-143028 (4 pages).
KIPO Office action dated Sep. 16, 2015 in corresponding KR application No. 10-2014-0008028, 5 pages.

* cited by examiner

*Primary Examiner* — Jessica Whiteley
(74) *Attorney, Agent, or Firm* — Lewis Roca Rothgerber Christie LLP

(57) ABSTRACT

An adhesive composition for a polarizing plate has good initial curing and an adhesive property. The adhesive composition includes (A) a polymerizable functional group-containing monomer capable of providing an anchor effect; (B) an epoxy group-containing compound; (D) a photoacid generator; and (E) at least one of a photopolymerization initiator and a photosensitizer.

12 Claims, 2 Drawing Sheets

(A)

(B)

ADHESIVE COMPOSITION FOR POLARIZING PLATE, ADHESIVE FILM FOR POLARIZING PLATE COMPRISING THE SAME, POLARIZING PLATE COMPRISING THE SAME AND DISPLAY DEVICE COMPRISING THE SAME

CROSS-REFERENCE TO RELATED APPLICATION

This application is a divisional of U.S. patent application Ser. No. 14/326,173, filed Jul. 8, 2014, entitled "ADHESIVE COMPOSITION FOR POLARIZING PLATE, ADHESIVE FILM FOR POLARIZING PLATE COMPRISING THE SAME, POLARIZING PLATE COMPRISING THE SAME AND DISPLAY DEVICE COMPRISING THE SAME", which claims the benefit of and priority to each of Japanese Patent Application No. 2013-143028, filed on Jul. 8, 2013 in the Japanese Patent Office; Japanese Patent Application No. 2013-152825, filed on Jul. 23, 2013 in the Japanese Patent Office; Korean Patent Application No. 10-2014-0008028, filed on Jan. 22, 2014 in the Korea Intellectual Property Office; Korean Patent Application No. 10-2014-0008027, filed on Jan. 22, 2014 in the Korea Intellectual Property Office, the entire content of each of which is incorporated herein by reference.

BACKGROUND

1. Technical Field

Embodiments of the present invention are directed toward an adhesive composition for a polarizing plate used when a polarizing plate is manufactured, an adhesive film for a polarizing plate using the same, a polarizing plate manufactured using the same, and a display device having the same. For example, embodiments of the present invention include an adhesive composition for a polarizing plate having good initial curing property and an adhesive property, and an adhesive film for a polarizing plate, a polarizing plate, and a display device using the same.

2. Discussion of Related Art

Recently, due to a high space-saving ability and an ability to implement precise pixels, flat panel displays, such as liquid crystal displays or plasma displays, have been widely used as display devices. Among them, the liquid crystal display has entered the spotlight due to more precise pixels and a higher power saving ability.

In a liquid crystal display panel, a polarizing plate serving as an optical shutter is combined and used with liquid crystals. The polarizing plate includes a polarizer which is an important (or essential) component for the liquid crystal display panel. Because a general polarizer is manufactured by uniaxially stretching a length of a polyvinyl alcohol (PVA) resin five times to six times, it is likely to be torn. Therefore, the polarizer is used in the polarizing plate while adhering a protective film to either or both surfaces of the polarizer. In this case, an adhesive should have physical properties suitable for adhering the protective film to the polarizer and physical properties suitable for use with the polarizing plate.

As an example of such an adhesive for the polarizing plate, an active energy ray-curable adhesive for an optical film containing a compound (A) having an active energy ray-curable cationic compound (a1) having an epoxy group or an oxetanyl group (e.g., as an essential component) and an acrylic resin (B) having an epoxy group or an oxetanyl group of a specific molecular weight has been used.

In addition, an active energy ray-curable adhesive composition containing a base compound including (A) a (meth)acrylic-based radical polymerizable compound and (B) a cationic polymerizable compound, and (C) a photo radical polymerization initiator and (D) a photocationic polymerization initiator has been used. For example, the base compound includes (A1) 5 wt % to 40 wt % of a (meth)acrylic-based compound having two or more (meth)acrylic groups in a molecule, (A2) 15 wt % to 55 wt % of a (meth)acrylic-based compound having a hydroxyl group and only one (meth)acrylic group in a molecule, and (B1) 15 wt % to 65 wt % of a cationic polymerizable compound having a (meth)acrylic group in a molecule.

SUMMARY

An aspect of an embodiment of the present invention is directed toward an adhesive composition for a polarizing plate. According to an embodiment, the adhesive composition for a polarizing plate includes (A) a polymerizable functional group-containing monomer capable of providing an anchor effect; (B) an epoxy group-containing compound; (D) a photoacid generator; and (E) at least one of a photopolymerization initiator and a photosensitizer.

(A) the polymerizable functional group-containing monomer capable of providing an anchor effect may include (A1) a polymerizable functional group-containing macromonomer or (A2) an allyl-group-and-hydroxyl-group-containing (meth)acrylate monomer.

The adhesive composition may include (A1) the polymerizable functional group-containing macromonomer in an amount of about 0.5 parts by weight to about 30 parts by weight, (B) the epoxy group-containing compound in an amount of about 40 parts by weight to about 99.5 parts by weight, (C) the (meth)acrylic-based monomer of about 0 parts by weight to about 59.5 parts by weight, (D) the photoacid generator in an amount of about 1 part by weight to about 7 parts by weight, and (E) the at least one of the photopolymerization initiator and the photosensitizer in an amount of about 0.1 parts by weight to about 7 parts by weight, with respect to 100 parts by weight of (A)+(B)+(C).

The adhesive composition may include (A2) the allyl-group-and-hydroxyl-group-containing (meth)acrylate monomer in an amount of about 20 parts by weight to about 70 parts by weight, (B) the epoxy group-containing compound in an amount of about 20 parts by weight to about 80 parts by weight, (C) the (meth)acrylic-based monomer in an amount of about 0 parts by weight to about 30 parts by weight, (D) the photoacid generator in an amount of about 1 part by weight to about 7 parts by weight, and (E) the at least one of the photopolymerization initiator and the photosensitizer in an amount of about 0.1 parts by weight to about 7 parts by weight, with respect to 100 parts by weight of (A)+(B)+(C).

Another aspect of an embodiment of the present invention is directed toward a polarizing plate having a protective film and a polarizer that are bonded together using the adhesive composition for a polarizing plate.

Still another aspect of an embodiment of the present invention is directed toward a display device including the polarizing plate.

BRIEF DESCRIPTION OF THE DRAWINGS

The above and other objects, features and advantages of the present invention will become more apparent by reference to the following Detailed Description when considered together with the accompanying drawings, in which.

DETAILED DESCRIPTION

Figure 1:
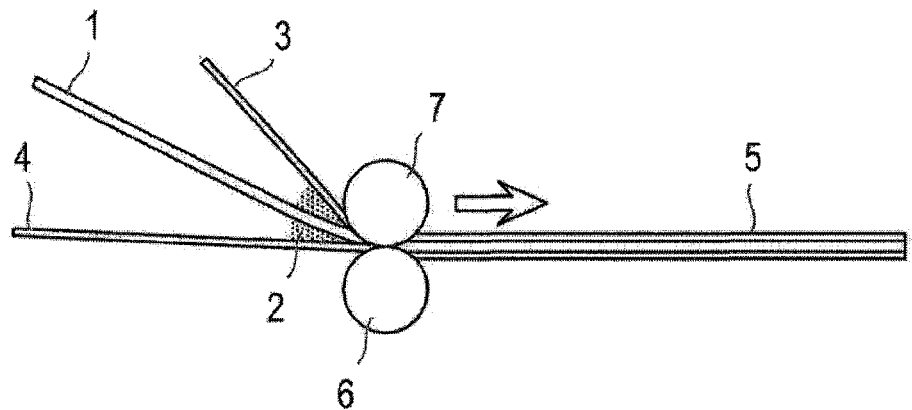
FIG. 1 is a diagram schematically illustrating an embodiment of a process of manufacturing a polarizing plate.

Example embodiments will now be described more fully hereinafter with reference to the accompanying drawings; however, the present invention may be embodied in many different ways and should not be construed as limited to the embodiments set forth herein. Rather, these embodiments are provided so that this disclosure will be thorough and complete, and will fully convey example embodiments to those skilled in the art. In the drawings, the dimensions of layers and regions may be exaggerated for clarity of illustration. Also, in the context of the present application, when a first element is referred to as being "on" a second element, it can be directly on the second element or be indirectly on the second element with one or more intervening elements interposed therebetween. Like reference numerals designate like elements throughout the specification.

As used herein, numerical ranges expressed as "X to Y" each represent a range of "equal to or greater than X and equal to or less than Y." Also, in this specification, "weight" and "mass," "wt %" and "mass %," and "parts by mass" and "parts by weight" may have the same meaning, unless otherwise specifically described. In addition, unless otherwise specifically described, measurement of physical properties and the like is performed under conditions of room temperature (e.g., 20° C. to 25° C.) and a relative humidity of 40% to 60%.

As used herein, the term "protective film" may refer to a non-phase difference protective film having no phase difference or a phase difference protective film having a phase difference. The symbol "*" in this specification represents a connected portion (e.g., a bonding site) of an element. The terms "above" and "below" in this specification are based on the drawings, and "above" may mean "below" or "below" may mean "above," depending upon the point of view.

(1) Adhesive Composition for a Polarizing Plate

An aspect of an embodiment of the present invention is directed toward an adhesive composition for the polarizing plate. The adhesive composition for a polarizing plate includes (A) a polymerizable functional group-containing monomer capable of providing an anchor effect; (B) an epoxy group-containing compound; (D) a photoacid generator; and (E) a photopolymerization initiator and/or a photosensitizer.

As used herein, the "adhesive composition for a polarizing plate" may be hereinafter referred to as an "adhesive composition" or a "composition."

As described above, other adhesives for polarizing plates do not sufficiently balance initial curing and an adhesive property. On the other hand, an embodiment of the present invention uses an adhesive composition for a polarizing plate including a polymerizable functional group-containing monomer capable of providing an anchor effect and an epoxy group-containing compound at set percentages (or set percentage ranges), thereby achieving (or implementing) a balance of good initial curing and an adhesive property.

Hereinafter, components of the adhesive composition of embodiments of the present invention will be described in more detail.

[Polymeric Component]

The adhesive composition for a polarizing plate of the present invention includes (A) a polymerizable functional group-containing monomer capable of providing an anchor effect; (B) an epoxy group-containing compound; (D) a photoacid generator; and (E) a photopolymerization initiator and/or a photosensitizer. In the adhesive composition for a polarizing plate, (A) to (C) are polymeric components.

Also, as used herein, the term "(meth)acrylate" may refer to acrylate or methacrylate.

(A) Polymerizable Functional Group-Containing Monomer Capable of Providing an Anchor Effect The polymerizable functional group-containing monomer capable of providing an anchor effect according to embodiments of the present invention includes a monomer having a polymerizable group (an unsaturated group). The polymerizable functional group-containing monomer includes a main part and a polymerizable functional group. In embodiments of the present invention, in the polymerizable functional group-containing monomer capable of providing an anchor effect, the main part or the polymerizable functional group part may provide (or express) the anchor effect. Also, the main part and the polymerizable functional group part may express the anchor effect together.

As used herein, the term "anchor effect" refers to a polymeric material included in the composition penetrating into a physical void space of a surface of an adherend, thereby further increasing an adhesive force.

As used herein, the term "main part of the polymerizable functional group-containing monomer (A)" refers to a portion of (A) the polymerizable functional group-containing monomer that does not include the polymerizable functional group.

As used herein, the term "bulky" may refer to a size, a volume, three-dimensionality, and/or the like of a material that is large in terms of chemistry (e.g., sterically large).

In an embodiment, the adhesive composition for a polarizing plate may be applied onto a surface of the protective film and used. Because a solution of the applied adhesive composition is able to dissolve the surface of the protective film, the (A) polymerizable functional group-containing monomer capable of providing an anchor effect penetrates into a film resin layer (e.g., the surface of protective film). Then, when UV light is radiated onto the adhesive solution, the component (A) according to an embodiment of the present invention, which is relatively bulky, penetrates into the partially dissolved surface of the protective film and is polymerized, thereby providing (or expressing) the anchor effect. In this case, as the main part or the polymerizable functional group of the polymerizable functional group-containing monomer capable of providing an anchor effect is bulky, an adhesive force between the adhesive and the film may further increase after polymerization.

The (A) polymerizable functional group-containing monomer capable of providing an anchor effect may include (A1) a polymerizable functional group-containing macromonomer or (A2) an allyl-group-and-hydroxyl-group-containing (meth)acrylate monomer.

(A1) Polymerizable Functional Group-Containing Macromonomer

The polymerizable functional group-containing macromonomer (also referred to herein as a "macro monomer"

or "macromer") according to embodiments of the present invention may include a polymerizable functional group (e.g., an unsaturated group) and a polymer chain part having a high molecular weight. In an example, the (A1) macro monomer is applied onto the film as an adhesive solution mixed with the (B) epoxy group-containing compound, the (C) other monomers, and the like, which will be described further below. The adhesive solution applied onto the film dissolves (e.g., partially dissolves) the surface of the film and the macromer component penetrates into the film resin layer. Then, when UV light is radiated onto the adhesive solution, the polymerizable functional group of the macromer is polymerized by chemically and physically intertwining with polymer chains formed from the (B) epoxy group-containing compound. It is believed that because polymerization is performed through such a process, side chains derived from the macro monomer, which elongate from an entangled state, enter the protective film. This may provide (or act) as the anchor effect, and thereby the initial curing and the adhesive property of the adhesive composition (or of the film formed from the adhesive composition) may increase. Although the embodiments disclosed herein are believed to act or operate according to the mechanisms described, the scope of the present invention is not limited by any particular mechanism or theory.

As the polymerizable functional group of the (A1) macro monomer, for example, a group having an ethylenically unsaturated double bond (e.g., an ethylenically unsaturated group) may be used, but the present invention is not limited thereto. For example, the ethylenically unsaturated group may include at least one of a vinyl group, an allyl group, a (meth)acryloyl group, and/or a propenyl group. The polymerizable functional group may be present at a terminal end of the macro monomer. For example, the polymerizable functional group may be present as a side chain of the macro monomer or at both terminal ends of a chain of the macro monomer. In an embodiment, when the polymerizable functional group is only at one terminal end of the macro monomer, it is possible to improve the stability of the polymerization reaction of the composition.

The polymer chain part of the (A1) macro monomer may include a (co)polymer including a repeating unit derived from, for example, methyl(meth)acrylate, ethyl(meth)acrylate, n-butyl(meth)acrylate, alkyl(meth)acrylate, stearyl (meth)acrylate, i-butyl(meth)acrylate, t-butyl(meth)acrylate, styrene, (meth)acrylonitrile, hydroxy(meth)acrylate, ethylhexyl(meth)acrylate, and silicone, as a main component unit. As used herein, the terms (meth)acrylate and (meth) acryl refer to acrylates and methacrylates, and acryl groups and methacryl groups, respectively. The foregoing polymer chain parts may be included as (or formed in) a single repeating unit or a plurality of repeating units. Also, when the polymer chain is a copolymer including (or made of) the plurality of repeating units, there is no limitation on the arrangement of the repeating units and the polymer chain may include any of an alternating copolymer, a random copolymer, and a block copolymer.

The macro monomer may include a monomer represented by Formula 1.

[Formula 1]

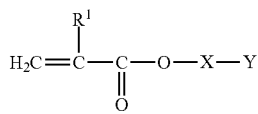

In Formula 1, $R^1$ represents a hydrogen atom or a methyl group. X represents a monovalent or bivalent bonding group. Y represents a polymer chain formed by homopolymerization or copolymerization of one or two or more monomers selected from among alkyl(meth)acrylate, stearyl (meth)acrylate, styrene, (meth)acrylonitrile, hydroxy(meth) acrylate, and silicone. The alkyl(meth)acrylate may include methyl(meth)acrylate, ethyl(meth)acrylate, n-butyl(meth) acrylate, i-butyl(meth)acrylate, t-butyl(meth)acrylate, ethylhexyl(meth)acrylate or the like. In an embodiment, Y may include a polymer chain formed by homopolymerization of methyl(meth)acrylate, styrene, and n-butyl(meth)acrylate or a polymer chain formed by copolymerization of (meth) acrylonitrile and styrene.

Examples of the bivalent bonding group may include a linear, branched, or cyclic alkylene group, an aralkyl group, an arylene group, and the like. The bivalent bonding group may further include a substituent such as a hydroxyl group and a cyano group. The number of carbon atoms of the alkylene group may be about 1 to about 10, or about 1 to about 4. As the alkylene group, for example, a methylene group, an ethylene group, a propylene group, a butylene group, a pentylene group, a hexylene group, an octylene group, and a decylene group may be used. In an embodiment, as the alkylene group, a methylene group, an ethylene group, a propylene group, and/or the like may be used. The number of carbon atoms of the aralkyl group may be about 7 to about 13. As the aralkyl group, for example, a benzylene group and a cinnamylidene group, may be used. The number of carbon atoms of the arylene group may be about 6 to about 12. As the arylene group, for example, a phenylene group, a cumulene group, a mesitylene group, a tolylene group, and a xylylene group, may be used. In an embodiment, as the arylene group, a phenylene group may be used.

In the bivalent bonding group, —NR$^2$—, —COO—, —OCO—, —O—, —S—, —SO$_2$NH—, —NHSO$_2$—, —NHCOO—, —OCONH—, a group derived from a heterocycle, and/or the like may be included as an additional bonding group. R$^2$ represents, for example, hydrogen or an alkyl group having about 1 to about 10 carbon atoms such as a methyl group, an ethyl group, and a propyl group.

The macro monomer may have a number-average molecular weight (Mn) of about 2000 to about 20000, about 2000 to about 10000, or about 4000 to about 8000. Within any of the above ranges, the composition may have (or secure) a suitable (or sufficient) adhesive strength, good heat resistance, and a degradation of workability due to an increase in viscosity of the adhesive composition may be suppressed (or reduced). A value of the number-average molecular weight (Mn) may be controlled (or selected) by appropriately selecting amounts of a chain transfer agent, a polymerization initiator, and/or the like to be added to a polymerization system. According to embodiments of the present invention, the number-average molecular weight (Mn) of the macro monomer may be determined using a converted value of polystyrene measured by a gel permeation chromatography (GPC) method.

The macro monomer may have a glass transition temperature (Tg) of about −100° C. to about 150° C., about −100° C. to about less than 30° C., for example, about −100° C. to about 29.9° C. or about −90° C. to about 20° C. or less. Within any of the above ranges, a cohesive force (e.g., physical crosslinking effect) due to a micro domain of the macro monomer is provided (or expressed) and a suitable (or sufficient) cohesive force may be achieved (or secured). In addition, within any of the above ranges, it is possible to suppress (or reduce) the degradation of tackiness of the adhesive force of the composition.

The method of manufacturing the macro monomer is not particularly limited. For example, embodiments of the method may include (1) a method in which a polymer chain (e.g., a leaving polymer anion) of the macro monomer is manufactured by the reaction of a leaving anion and methacrylic acid chloride and/or the like; (2) a method in which a radically polymerizable monomer, such as methacrylate, is polymerized in the presence of a chain transfer agent such as mercaptoacetic acid to obtain an oligomer terminated with a carboxyl group, which is then reacted with methacrylic acid glycidyl and/or the like; and (3) a method in which a radically polymerizable monomer, such as methacrylate, is polymerized in the presence of an azo-based polymerization initiator having a carboxyl group to obtain an oligomer terminated with a carboxyl group, which is macro-monomerized (e.g., oligomerized) by methacrylic acid glycidyl.

When the macro monomer is manufactured using any of the above methods, the bivalent bonding group represented by X in Formula 1 may include, for example, any of Formulas 2-5.

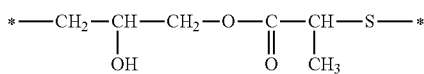
[Formula 2]

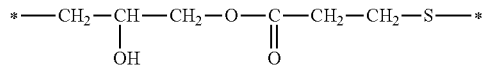
[Formula 3]

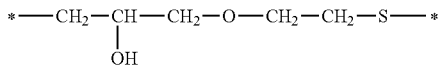
[Formula 4]

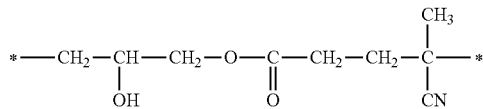
[Formula 5]

In Formulas 2-5, the symbol "*" represents a connected portion (e.g., a bonding site).

Any suitable commercial product may be used as the macro monomer. For example, a macro monomer terminated with a methacrylic group and having a polymer chain of polymethacrylate (PMMA) (e.g., product name: 45% AA-6 (AA-6S), AA-6; manufactured by Toagosei Co., Ltd.), a macro monomer having a polymer chain of polystyrene (e.g., product name: AS-6S, AS-6; manufactured by Toagosei Co., Ltd.), a macro monomer having a polymer chain of a copolymer of styrene/acryl nitrile (e.g., product name: AN-6S; manufactured by Toagosei Co., Ltd.), a macro monomer having a polymer chain of polybutylacrylate (e.g., product name: AB-6; manufactured by Toagosei Co., Ltd.), and/or the like may be used. In addition, these macro monomers may be used alone or in combination of two or more of them.

A mixing amount of the polymerizable functional group-containing macromonomer according to embodiments of the present invention may be about 0.5 parts by weight to about 30 parts by weight, with respect to 100 parts by weight of a sum of components (A)+(B)+(C). In an embodiment, a content of the component (A1) of the adhesive composition may be about 4 parts by weight to about 25 parts by weight, about 8 parts by weight to about 15 parts by weight, or about 5 parts by weight to about 10 parts by weight, with respect to 100 parts by weight of (A)+(B)+(C). Within any of the above ranges, because solubility and viscosity of the macro monomer are suitable for coating, a coating property may increase. Also, within any of the above ranges, the anchor effect may be provided (or expressed), and at the same time (or concurrently), an appropriate level of heat resistance may be achieved (or implemented).

(A2) Allyl-Group-and-Hydroxyl-Group-Containing (Meth)Acrylate Monomer

In another embodiment, an embodiment of the polymerizable functional group-containing monomer capable of providing an anchor effect may include an allyl-group-and-hydroxyl-group-containing (meth)acrylate monomer.

The allyl-group-and-hydroxyl-group-containing (meth)acrylate monomer is not particularly limited, as long as an allyl group and a hydroxyl group are included in the molecule. The allyl-group-and-hydroxyl-group-containing (meth)acrylate monomer may be obtained by reacting, for example, (meth)acrylic acid and a compound having an allyl group and an epoxy group.

When the allyl-group-and-hydroxyl-group-containing (meth)acrylate monomer is used as the component (A), a (meth)acrylate part (e.g., an acryloyl group) and an allyl group part react and a network structure (e.g., not a linear structure) is formed. In this case, the initial curing and the adhesive property of the composition (or of the film formed from the adhesive composition) may increase.

As an example of the allyl-group-and-hydroxyl-group-containing (meth)acrylate monomer, a (meth)acrylic acid ester having an allyl group, a hydroxyl group, and an alkyl group having about 1 to about 10 carbon atoms may be used. In this case, the statement "about 1 to about 10 carbon atoms" refers to the number of carbon atoms, except for the allyl group, in the (meth)acrylic acid ester. In this case, the "allyl group" may be at least one of an allyl group ($CH_2=CH-CH_2-$*), an allyloxy group ($CH_2=CH-CH_2-O-$*), and an allylthio group ($CH_2=CH-CH_2-S-$*). For example, the allyl group may include 3-allyloxy-2-hydroxypropyl(meth)acrylate, 3-allyloxy-1-hydroxypropyl(meth)acrylate, and/or the like. Other (meth)acrylates other than, or in addition to, the above examples may also be used, as long as the (meth)acrylate includes an allyl group and a hydroxyl group. Also, combinations of two or more of the above examples may be used.

A commercial product may be bought and prepared as the allyl-group-and-hydroxyl-group-containing (meth)acrylate monomer. Examples of suitable commercial products include ALHA manufactured by Osaka Organic Chemical Industry Ltd, and/or the like.

A mixing amount of the (A2) allyl-group-and-hydroxyl-group-containing (meth)acrylate monomer according to embodiments of the present invention may be about 20 parts by weight to about 70 parts by weight, with respect to 100 parts by weight of a total amount of components (A)+(B)+(C), for example, about 23 parts by weight to about 70 parts by weight or about 30 parts by weight to about 50 parts by weight, with respect to 100 parts by weight of a total amount of components (A)+(B)+(C). Within any of the above ranges, it is possible to prevent the adhesive property from decreasing (or to reduce an amount or likelihood of such a decrease) due to too much (e.g., overexpression) or insufficient "penetration" of the component (A) capable of contributing to (or providing) the anchor effect. Also, within any of the above ranges, it is possible to prevent heat resistance from decreasing (or to reduce an amount or likelihood of such a decrease) due to an excessive decrease in an amount of the component (B).

In an embodiment, when an acryl-based resin is used as the protective film, the adhesive composition may include the component (A2) at about 25 parts by weight to about 65 parts by weight or about 40 parts by weight to about 60 parts by weight, with respect to 100 parts by weight of a total amount of components (A)+(B)+(C).

In another embodiment, when triacetylcellulose (TAC) is used as the protective film, the adhesive composition may include the component (A2) at about 21 parts by weight to about 65 parts by weight, about 24 parts by weight to about 55 parts by weight, or about 40 parts by weight to about 60 parts by weight, with respect to 100 parts by weight of a total amount of components (A)+(B)+(C).

(B) Epoxy Group-Containing Compound

The epoxy group-containing compound used in embodiments of the present invention is not particularly limited, as long as the compound has an epoxy group. For example, the epoxy group-containing compound may include a compound having at least one epoxy group in a molecule of a unit compound. Also, as the (B) epoxy group-containing compound, a compound having a (meth)acrylate part (acryloyl group) may be used. For example, as the (B) epoxy group-containing compound, (meth)acrylate having one or more epoxy groups in a molecule of a unit compound, an epoxy resin having two or more epoxy groups in a molecule of a unit compound, and/or the like may be used. In an embodiment, a compound having two or more epoxy groups may be used. In this case, the two or more epoxy groups in the molecule of the unit compound form the network structure. Thereby, the composition (or the film formed from the adhesive composition) may have a balance of good initial curing and an adhesive property. For example, the (B) epoxy group-containing compound may have one epoxy group, two epoxy groups or three epoxy groups in a molecule of a unit compound.

The epoxy group-containing compound is also referred to herein as an "epoxy group-containing (meth)acrylate monomer." The epoxy group-containing compound having the (meth)acrylate part (e.g., the acryloyl group) may have an alkylene group having a linear shape having about 1 to about 8 carbon atoms, a branch shape having about 1 to about 8 carbon atoms, or a cyclic shape having about 3 to about 8 carbon atoms, an alkoxy group having about 1 to about 8 carbon atoms, or an arylene group having about 6 to about 12 carbon atoms between the epoxy group and the (meth) acrylate part (e.g., the acryloyl group).

Examples of the epoxy group-containing (meth)acrylate monomer may include glycidyl(meth)acrylate, 4-hydroxybutyl(meth)acrylateglycidylether (4HBAGE), 3,4-epoxybutyl(meth)acrylate, and (3,4-epoxycyclohexyl)methyl (meth)acrylate (Cyclomer-M100). These epoxy group-containing (meth)acrylate monomers may be used alone or in combination of two or more. Also, any suitable synthetic product or commercial product may be used as the epoxy resin.

Examples of the epoxy resin may include a bisphenol A type, a bisphenol F type, a bisphenol S type, a brominated bisphenol A type, hydrogen added bisphenol A types, a bisphenol AF type, a biphenyl type, a naphthalene type, a fluorene type, a trishydroxyphenylmethane type, a tetraphenylethane type, a bifunctional epoxy resin such as a resorcinol type; a novolac type epoxy resin such as a phenol novolac type epoxy resin or a cresol novolac type epoxy resin; a multifunctional epoxy resin; a glycidylamine type epoxy resin; a heterocyclic ring-containing epoxy resin; and an alicyclic epoxy resin. In addition to the above examples, an aliphatic epoxy resin, a hydrogen added aromatic epoxy resin, and/or the like may be used. The foregoing epoxy resins may be used alone or in combination of two or more. In addition, any suitable synthetic product or commercial product may be used as the epoxy resin. In some embodiments, a bisphenol F type epoxy resin, an alicyclic epoxy resin or the like may be used.

Examples of the commercial product may include 4HBAGE (manufactured by Nippon Kasei Co., Ltd.), Cyclomer M-100 and Cyclomer A-400 (manufactured by Daicel Corp.), Epicoat (registered trademark) series (Epicoat (registered trademark) 807, Epicoat (registered trademark) 815, Epicoat (registered trademark) 825, Epicoat (registered trademark) 827, Epicoat (registered trademark) 828, Epicoat (registered trademark) 834, Epicoat (registered trademark) 1001, Epicoat (registered trademark) 1004, Epicoat (registered trademark) 1007, and Epicoat (registered trademark) 1009 (manufactured by Japan Epoxy Resins Co., Ltd.); DER-330, DER-301, and DER-361 (manufactured by Dow Chemical Company); YD8125 and YDF8170 (manufactured by Tohto Chemical Industry Co., Ltd.); Epiclon (registered trademark) EXA-1514 (manufactured by DIC Corp.); Denacol (registered trademark) EX-251 (manufactured by Nagase ChemteX Corp.); Epicoat (registered trademark) 152 and Epicoat (registered trademark) 154 (manufactured by Japan Epoxy Resins Co., Ltd.); EPPN-501 (manufactured by Nippon Kayaku Co., Ltd.); DEN-438 (manufactured by Dow Chemical Company); EOCN-102S, EOCN-103S, EOCN-104S, EOCN-1012, EOCN-1025, and EOCN-1027 (manufactured by Nippon Kayaku Co., Ltd.); YDCN700-10 (manufactured by Tohto Chemical Industry Co., Ltd.); Araldite (registered trademark) ECN1280 (manufactured by Huntsman Japan Co., Ltd.); Epon 1031S (manufactured by Japan Epoxy Resins Co., Ltd.); Araldite (registered trademark) 0163 (manufactured by Ciba Specialty Chemicals Co., Ltd.); Denacol (registered trademark) EX-611, EX-614, EX-614B, EX-622, EX-512, EX-521, EX-421, EX-411, and EX-321 (manufactured by Nagase ChemteX Corp.); Epicoat (registered trademark) 604 (manufactured by Japan Epoxy Resins Co., Ltd.); YH-434 (manufactured by Tohto Chemical Industry Co., Ltd.); TETRAD (registered trademark)-X, TETRAD (registered trademark)-C (manufactured by Mitsubishi Gas Chemical Company, Inc); ELM-120 (manufactured by Sumitomo Chemical Co., Ltd.); Araldite (registered trademark) PT810 (manufactured by Ciba Specialty Chemicals Co., Ltd); ERL4234, ERL4299, ERL4221, and ERL4206 (manufactured by UCC Company); Epolead (registered trademark) series, Celloxide (registered trademark) series 2021P (manufactured by Daicel Corp.); Epiclon (registered trademark) EXA-830CRP, Epiclon (registered trademark) HP-4710, Epiclon (registered trademark) EXA-4816, EXA-4822, and EXA-4850 series, Epiclon (registered trademark) HPC-8000-65T (manufactured by DIC Corp.), and the like.

As described above, in the (B) epoxy group-containing compound, because two or more ring-opened epoxy groups react, the polymer has a network structure (e.g., instead of a linear structure). In the (A) polymerizable functional group-containing monomer capable of providing an anchor effect, the (meth)acrylate part and the polymerizable functional group part react to form part of the network structure. Because parts are simultaneously (or concurrently) polymerized, the network structure is considered to be connected by a cross linker having a structure of mutually interlaced parts (e.g., an interpenetrating polymer network). In this manner, it is considered that the initial curing and the adhesive property of the adhesive composition (or of the film formed from the adhesive composition) increase when the component (A) and the component (B) are complicatedly entangled (e.g., as an interpenetrating polymer network). Although the embodiments disclosed herein are believed to act or operate according to the mechanisms described, the scope of the present invention is not limited by any particular mechanism or theory.

In an embodiment, when the adhesive composition for a polarizing plate includes the (A2) allyl-group-and-hydroxyl-group-containing (meth)acrylate monomer as the component (A) and the epoxy group-containing compound in set percentages (or set percentage ranges), it is possible to implement (or achieve) a balance of good initial curing and an adhesive property of the adhesive composition (or of the film formed from the adhesive composition). In an embodiment, a mass ratio of the component (A): the component (B) in the adhesive composition may be 1:0.25 to 1:3.5. Within the above range, the composition (or the film formed from the adhesive composition) may have a balance of good initial curing and an adhesive property.

In an embodiment, when (A1) is used as the component (A), a mixing amount of the (B) epoxy group-containing compound is about 40 parts by weight to about 99.5 parts by weight, with respect to 100 parts by weight of a sum of components (A)+(B)+(C). In an embodiment, a content of the component (B) may be about 75 parts by weight to about 96 parts by weight, about 85 parts by weight to about 92 parts by weight, or about 90 parts by weight to about 95 parts by weight with respect to 100 parts by weight of (A)+(B)+(C). Within any of the above ranges, it is possible to prevent peel strength from decreasing (or to reduce an amount or likelihood of such a decrease) while maintaining the anchor effect of the adhesive composition. In addition, within any of the above ranges, it is possible to prevent solubility of the adhesive composition from decreasing (or to reduce an amount or likelihood of such a decrease) caused by inclusion of an excessive amount of the component (A). Also, it is possible to prevent a degree of crosslinking of the composition from decreasing and heat resistance or peel strength from decreasing (or to reduce an amount or likelihood of such decreases).

In another embodiment, when (A2) is used as the component (A), a mixing amount of the (B) epoxy group-containing compound may be about 20 parts by weight to about 80 parts by weight, with respect to 100 parts by weight of a total amount of components (A)+(B)+(C). For example, the mixing amount may be about 30 parts by weight to about 80 parts by weight, or about 30 parts by weight to about 50 parts by weight, with respect to 100 parts by weight of a total amount of components (A)+(B)+(C). Within any of the above ranges, it is possible to prevent adhesion and penetrability of the composition to the protective film from decreasing (or to reduce an amount or likelihood of such decreases) and it is possible to increase adhesion strength and a coating property.

Also, in another embodiment, when (A2) is used as the component (A), a mixing amount of the (B) epoxy group-containing compound is about 35 parts by weight to about 75 parts by weight, or about 40 parts by weight to about 60 parts by weight, with respect to 100 parts by weight of (A)+(B)+(C). Within any of the above ranges, adhesive force to the protective film using an acryl-based resin may further increase.

In still another embodiment, when (A2) is used as the component (A), a mixing amount of the (B) epoxy group-containing compound is about 35 parts by weight to about 79 parts by weight, about 45 parts by weight to about 76 parts by weight, or about 40 parts by weight to about 60 parts by weight, with respect to 100 parts by weight of (A)+(B)+(C). In this case, adhesive force to the protective film using TAC may further increase.

(C) Other Monomers

The adhesive composition for a polarizing plate of embodiments of the present invention may further include a monomer (e.g., other monomers) in addition to the component (A) and the component (B). For example, if only an epoxy resin is used as the component (B) (e.g., the epoxy group-containing (meth)acrylate monomer is not included), when the other monomers are included in the composition, a physical property of the composition may further improve. In general, because the epoxy resin has high viscosity, it is possible to decrease viscosity of the adhesive solution and increase wettability to various suitable films using the other monomers having low viscosity (e.g., instead of the epoxy group-containing (meth)acrylate monomer). Also, the other monomers may be used in combinations of two or more.

In one embodiment, (A1) may be used as component (A). In this case, an upper limit of the usage amount of (C) (e.g., the amount of (C) included in the composition) is about 59.5 parts by weight, with respect to 100 parts by weight of a total amount of the components (A) to (C). When the usage amount exceeds 59.5 parts by weight, because the content of a component (e.g., an essential component) such as the component (A) or the component (B) excessively decreases, a desired effect of embodiments of the present invention may not be obtained. For example, the content of the component (C) may be about 55 parts by weight or about 52 parts by weight. In an embodiment, the content of the component (C) is about 1 part by weight to about 20 parts by weight.

In another embodiment, (A2) may be used as component (A). In this case, an upper limit of the usage amount of (C) (e.g., the amount of (C) included in the composition) is about 30 parts by weight, with respect to 100 parts by weight of a total amount of the components (A) to (C). When the usage amount exceeds 30 parts by weight, because the content of a component (e.g., an essential component) such as the component (A) or the component (B) excessively decreases, a desired effect of embodiments of the present invention may not be obtained. For example, the content of the component (C) may be about 25 parts by weight or about 23 parts by weight. In an embodiment, the content of the component (C) is about 0.1 parts by weight to about 30 parts by weight, or about 10 parts by weight to about 20 parts by weight.

Examples of the other monomers may include a hydroxyl group-containing (meth)acryl monomer, an aromatic ring-containing (meth)acrylate monomer, an alicyclic-containing (meth)acrylate monomer, or a heterocyclic ring-containing (meth)acrylate monomer. With any of the above examples, it is possible to increase the initial curing and the adhesive property of the film of the adhesive composition for a polarizing plate. Also, the "other monomers" may dissolve, for example, the component (A). In this case, the component (A) is capable of easily penetrating into the film resin layer and the network structure may be beneficially formed.

In an embodiment, when the adhesive composition includes the (A1) polymerizable functional group-containing macromonomer as the component (A), a mixture of the hydroxyl group-containing (meth)acryl monomer and the aromatic ring-containing (meth)acrylate monomer may be used as the component (C). In this case, compatibility between the components may further increase. The hydroxyl group-containing (meth)acryl monomer is not particularly limited, as long as the (meth)acryl monomer includes a hydroxyl group in the molecule. The number of hydroxyl groups in the molecule is not particularly limited, and may be one, two, or three or more. In this manner, when a monomer having a hydroxyl group in the molecule is used as one of the other monomers, hydrogen bonding power (or strength) in the composition increases, and an adhesive property of the adhesive composition (or of the film formed from the adhesive composition) with polyvinyl alcohol (PVA) used in the polarizer increases.

In one embodiment, a hydroxyl group-containing (meth) acryl monomer that does not contain an allyl group may be used.

The hydroxyl group-containing (meth)acryl monomer is not particularly limited, but may include a (meth)acrylic acid ester having at least one hydroxyl group and an alkyl group having about 1 to about 20 carbon atoms and a (meth)acrylamide having at least one hydroxyl group and being N-substituted with an alkyl group having about 1 to about 5 carbon atoms.

Examples of the hydroxyl group-containing (meth)acryl monomer may include 2-hydroxy-3-phenoxypropyl(meth) acrylate, 2-hydroxyethyl(meth)acrylate, 4-hydroxybutyl (meth)acrylate, 1,6-hexanediolmono(meth)acrylate, pentaerythritoltri(meth)acrylate, dipentaerythritolpenta(meth) acrylate, neopentylglycolmono(meth)acrylate, trimethylolpropanedi(meth)acrylate, trimethylolethanedi (meth)acrylate, 2-hydroxypropyl(meth)acrylate, 2-hydroxybutyl(meth)acrylate, 4-hydroxy-cyclohexyl(meth)acrylate, N-2-hydroxyethyl(meth)acrylamide, cyclohexanedimethanolmonoacrylate, 2-(meth)acryloyloxyethyl-2-hydroxyethyl-phthalic acid, and lactone-modified hydroxyethyl (meth)acrylate (Daicel Corp. product, "Placcel"). These examples may be used alone or in a combination of two or more.

In an embodiment, the hydroxyl group-containing (meth) acryl monomer may be 2-hydroxyethyl(meth)acrylate, 4-hydroxybutyl(meth)acrylate or lactone-modified hydroxyethyl (meth)acrylate. In this case, it is possible to increase initial curing and an adhesive property of the film of the adhesive composition for a polarizing plate.

The aromatic ring-containing (meth)acrylate monomer according to embodiments of the present invention is not particularly limited, as long as the (meth)acryl monomer has an aromatic ring in the molecule. The aromatic ring (for example: an aromatic ring having 6 carbon atoms to 20 carbon atoms) is not particularly limited, and may include, for example, a benzene ring. In this manner, when a monomer having a bulky part (such as a benzene ring) in the molecule is used as one of the other monomers, the anchor effect may be provided by penetration of the bulky part into the protective film. Examples of the aromatic ring-containing (meth)acrylate monomer may include phenoxyethyl (meth)acrylate, phenoxytriethyleneglycoldi(meth)acrylate, phenoxydiethyleneglycol(meth)acrylate, phenoxyethyleneglycoldi(meth)acrylate, phenyl(meth)acrylate, benzyl (meth)acrylate, phenylethyl(meth)acrylate, 4-methylphenylethyl(meth)acrylate, ethylphenylethyl(meth)acrylate, isopropyl phenylethyl(meth)acrylate, 4-butyl-phenylethyl (meth)acrylate, 4-methylbenzyl(meth)acrylate, phenoxyethyl(meth)acrylate, 4-methylphenoxyethyl(meth)acrylate, 3-phenylpropyl(meth)acrylate, 4-phenylbutyl(meth)acrylate, p-benzylphenylethyl(meth)acrylate, p-chlorophenylethyl(meth)acrylate, m-chlorophenylethyl(meth)acrylate, o-chlorophenylethyl(meth)acrylate, p-bromophenylethyl (meth)acrylate, m-bromophenylethyl(meth)acrylate, o-bromophenylethyl(meth)acrylate, dichlorophenylethyl(meth) acrylate, dibromophenylethyl(meth)acrylate, pentachlorophenylethyl(meth)acrylate, naphthyl(meth)acrylate, and naphthylethyl(meth)acrylate.

As an example, the aromatic ring-containing (meth)acrylate monomer may be a (meth)acrylic acid ester having a substituted or unsubstituted aryloxy group having about 6 carbon atoms to about 10 carbon atoms and an alkyl group having about 1 carbon atom to about 10 carbon atoms. In this case, the term "substituted" may refer to a hydrogen atom being substituted by an alkyl group having 1 carbon atom to 5 carbon atoms. In an embodiment, when phenoxyethyl (meth)acrylate or methylphenoxyethyl(meth)acrylate is used as the aromatic ring-containing (meth)acrylate monomer, it is possible to increase the initial curing and the adhesive property of the film of the adhesive composition for a polarizing plate.

The alicyclic-containing (meth)acrylate monomer is not particularly limited, as long as the (meth)acryl monomer includes an alicycle (for example, an alicycle having about 3 carbon atoms to about 20 carbon atoms) in the molecule. In the above, the alicycle is not particularly limited, and may include, for example, a cyclohexane ring, an adamantyl ring, and/or the like. In this manner, when a monomer having a bulky part (such as a cyclohexane ring, an adamantyl ring, and/or the like) in the molecule is used as one of the other monomers, the anchor effect may be provided by penetration of the bulky part into the protective film. As an example, the alicyclic-containing (meth)acrylate monomer may include cyclohexyl(meth)acrylate, dicyclopentadienyldi(meth)acrylate, isobornyl(meth)acrylate, adamantyl(meth)acrylate, 3,5-dimethyladamantyl(meth)acrylate, and 4-t-butylcyclohexyl (meth)acrylate.

In an embodiment, when cyclohexylacrylate and dicyclopentadienyldiacrylate are used, it is possible to increase the initial curing and the adhesive property of the adhesive composition of the film for a polarizing plate.

The heterocyclic ring-containing (meth)acrylate monomer according to the present invention is a (meth)acryl monomer having a heterocycle in the molecule. The heterocycle is not particularly limited and may include a morpholine ring, a piperidine ring, a pyrrolidine ring, a piperazine ring, and/or the like. In this manner, when a monomer having a bulky part (such as a heterocycle) in the molecule is used as one of the other monomers, the anchor effect may be provided by penetration of the bulky part into the protective film, which will be described further below. In an embodiment, examples of the heterocyclic ring-containing (meth)acrylate monomer may include N-acryloylmorpholine, N-acryloylpiperidine, N-methacrylopiperidine, tetrahydrofurfuryl(meth)acrylate, and N-acryloylpyrrolidine.

In another embodiment, when tetrahydrofurfurylacrylate is used, it is possible to increase the initial curing and the adhesive property of the film of the adhesive composition for a polarizing plate using characteristics of low viscosity and high film solubility.

In one embodiment, at least one of the hydroxyl group-containing (meth)acryl monomer and the aromatic ring-containing (meth)acrylate monomer may be used as the component (C). In this case, the component (C) may include the hydroxyl group-containing (meth)acryl monomer in an amount of about 5 parts by weight to about 50 parts by weight, for example, about 5 parts by weight to about 20 parts by weight, and the component (C) may include the aromatic ring-containing (meth)acrylate monomer in an amount of about 10 parts by weight to about 30 parts by weight, with respect to 100 parts by weight of a sum of (A1)+(B)+(C).

In one embodiment, the adhesive composition for a polarizing plate may include (A) in an amount of about 1 part by weight to 30 parts by weight, or about 1 part by weight to about 20 parts by weight and (B) in an amount of about 70 parts by weight to about 99 parts by weight, or about 80 parts by weight to about 99 parts by weight, with respect to 100 parts by mass of a sum of (A) and (B). Within any of the above ranges, the initial curing and the adhesive property of the adhesive composition (or of the film formed from the adhesive composition) may increase.

In one embodiment, the adhesive composition for a polarizing plate may include (A1) in an amount of about 1 part by weight to about 20 parts by weight, about 5 parts by weight to about 15 parts by weight, (B) in an amount of about 40 parts by weight to about 90 parts by weight, or about 40 parts by weight to about 80 parts by weight, and (C) in an amount of about 1 part by weight to about 50 parts by weight, or about 10 parts by weight to about 50 parts by weight, with respect to 100 parts by mass of a sum of (A)+(B)+(C). Within any of the above ranges, the initial curing and the adhesive property of the adhesive composition (or of the film formed from the adhesive composition) for a polarizing plate may increase.

In another embodiment, the adhesive composition for a polarizing plate may include (A2) in an amount of about 20 part by weight to about 70 parts by weight, about 20 parts by weight to about 50 parts by weight, (B) in an amount of about 20 parts by weight to about 90 parts by weight, or about 20 parts by weight to about 80 parts by weight, and (C) in an amount of about 0 part by weight to about 30 parts by weight, or about 10 parts by weight to about 30 parts by weight, with respect to 100 parts by mass of a sum of (A)+(B)+(C). Within any of the above ranges, the initial curing and the adhesive property of the adhesive composition (or of the film formed from the adhesive composition) for a polarizing plate may increase.

[Photoacid Generator]

The photoacid generator generates a strong acid when light is irradiated onto it. The strong acid attacks (or reacts with) the epoxy group-containing compound and polymerization of the epoxy group-containing (meth)acrylate monomer begins. As the photoacid generator, any suitable photoacid generators available in the art may be used without limitation. For example, an aromatic diazo salt, an iodonium salt such as an aromatic iodonium salt or an aromatic sulfonium salt, and an iron-arene complex are examples of the photoacid generator. The above examples may be used alone or in a combination of two or more as the photoacid generator.

Examples of the aromatic diazo salt may include benzenediazonium hexafluoroantimonate, benzenediazonium hexafluorophosphate, and benzenediazonium hexafluoroborate.

Examples of the aromatic iodonium salt may include diphenyliodoniumtetrakis(pentafluorophenyl)borate, diphenyliodonium hexafluorophosphate, diphenyliodoniumhexafluoroantimonate, and di(4-nonylphenyl)iodoniumhexafluorophosphate.

Examples of the aromatic sulfonium salt may include triphenylsulfoniumhexafluorophosphate, triphenylsulfonium hexafluoroantimonate, triphenylsulfoniumtetrakis(pentafluorophenyl)borate, diphenyl-[4-(phenylthio)phenyl]sulfoniumhexafluoroantimonate, 4,4'-bis[diphenylsulfonyl]diphenylsulfidebishexafluorophosphate, 4,4'-bis[di(p-hydroxyethoxy)phenylsulfonyl]diphenylsulfidebishexafluoroantimonate, 4,4'-bis[di(p-hydroxyethoxy)phenylsulfonyl]diphenylsulfidebishexafluorophosphate, 7-[di(p-toluyl)sulfonyl]-2-isopropylthioxanthonehexafluoroantimonate, 7-[di(p-toluyl)sulfonyl]-2-isopropylthioxanthonetetrakis(pentafluorophenyl)borate, 4-phenylcarbonyl-4'-diphenylsulfonyl-diphenylsulfidehexafluorophosphate, 4-(p-tert-butylphenylcarbonyl)-4'-diphenylsulfonyl-diphenylsulfidehexafluoroantimonate, 4-(p-tert-butylphenylcarbonyl)-4'-di(p-toluyl)sulfonyl-diphenylsulfidetetrakis(pentafluorophenyl)borate, and phosphate of diphenyl[4-(phenylthio)phenyl]sulfonium.

Examples of the iron-arene complex may include xylene-cyclopentadienyl iron (II) hexafluoroantimonate, cumene-cyclopentadienyl iron (II), hexafluorophosphate, and xylene-cyclopentadienyl iron (II)-tris(trifluoromethylsulfonyl)methide.

Any suitable commercial product may be used as the photoacid generator. Examples of suitable commercial products of the photoacid generator may include CPI-100P, 101A, 200K, and 210S (each manufactured by San-Apr Ltd.), KAYARAd (registered trademark) PCI-220 and PCI-620 (each manufactured by Nippon Kayaku Co., Ltd.), UVI-6990 (manufactured by Union Carbide Corp.), Adeca Optomer (registered trademark) SP-150 and SP-170 (each manufactured by ADEKA Corp.), CI-5102, CIT-1370, 1682, CIP-1866S, 2048S, and 2064S (each manufactured by Nippon Soda Co., Ltd.), DPI-101, 102, 103, 105, MPI-103, 105, BBI-101, 102, 103, 105, TPS-101, 102, 103, 105, MDS-103, 105, and DTS-102 and 103 (each manufactured by Green Chemical Co., Ltd.), and PI-2074 (each manufactured by Rhodia Japan Co., Ltd.).

A usage amount of the photoacid generator (e.g., the amount of the photoacid generator included in the adhesive composition) may be about 1 part by weight to about 7 parts by weight, about 1.5 part by weight to about 4 parts by weight, or about 1 part by weight to about 4 parts by weight, with respect to 100 parts by weight of a polymeric component ((A)+(B)+(C)). When the usage amount of the photoacid generator is less than about 1 part by weight, curing of the adhesive composition after ultraviolet radiation may decrease (e.g., the curing rate of the adhesive composition upon exposure to ultraviolet light may be lower). When the usage amount of the photoacid generator exceeds about 7 parts by weight, the adhesive property or durability of the adhesive composition (or of the film formed from the adhesive composition) is likely to be insufficient due to a bleed out component (e.g., a component that bleeds out of the film).

[Photopolymerization Initiator and Photosensitizer]

The adhesive composition of embodiments of the present invention may also include at least one of the photopolymerization initiator and/or a photosensitizer. The photopolymerization initiator is not particularly limited, and any suitable photopolymerization initiators available in the art may be used. The photopolymerization initiator may be used alone or in combination of two or more.

Examples of the photopolymerization initiator may include hydrogen peroxide, inorganic peroxides such as potassium persulphate or ammonium persulfate, t-butyl hydroperoxide, peroxide t-dibutyl, cumene hydroperoxide, acetyl peroxide, organic peroxides such as benzoyl peroxide and lauroyl peroxide, azo compounds such as azobisisobutyronitrile, azobis-2,4-dimethylvaleronitrilenitrile, azobiscyclohexanecarbonitrile, azobisisovaleric acid methyl, azobisisobutylamidinehydrochloride, and azobiscyano valeric acid, acetophenones, benzoins, benzophenones, phosphineoxides, ketals, anthraquinones, thioxantones, 2,3-dialkyldione compounds, disulfide compounds, fluoroamine compounds, aromatic sulfoniums, rofin dimers, onium salts, borate salts, active esters, active halogens, inorganic complexes, coumarins, and the like.

For example, acetophenones such as acetophenone, 3-methylacetophenone, benzyldimethylketal, 1-(4-isopropyl phenyl)-2-hydroxy-2-methylpropan-1-one, 2-methyl-1-[4-(methylthio)phenyl]-2-morpholinopropan-1-one, and 2-hydroxy-2-methyl-1-phenylpropan-1-one; benzophenones such as benzophenone, 4-chlorobenzophenone, and 4,4'-diamino-benzophenone; benzoinethers such as benzoinpropylether and benzoinethylether; thioxantones such as 4-isopropylthioxanthone; xanthone, fluorenone, camphorquinone, benzaldehyde, and anthraquinone may be used.

Any suitable commercial product may be used as the photopolymerization initiator. For example, IRGACURE (registered trademark)-184, 819, 907, 651, 1700, 1800, 819, 369, and 261, DAROCUR-TPO (each manufactured by BASF Japan Ltd.), Darocure (registered trademark)-1173 (manufactured by Merck & Co., Inc.), Esacure KIP150, TZT (each manufactured by DKSH Japan Co., Ltd.), and Kayacure (registered trademark) BMS, DMBI (each manufactured by Nippon Kayaku Co., Ltd.) may be used.

The inorganic peroxides and the organic peroxides may be used together with an appropriate reducing agent such as an ethylamine, amines such as triethanolamine and dimethylaniline, a polyamine, a bivalent iron salt compound, ammonia, organic metal compounds such as triethylaluminum, triethylboron, and diethylzinc, sodium sulfite, sodium hydrogen sulfite, cobalt naphthenate, sulfinic acid, and mercaptan.

The adhesive composition for a polarizing plate of embodiments of the present invention may use a photosensitizer instead of the photopolymerization initiator or in addition to the photopolymerization initiator. The photosensitizer is not particularly limited and any suitable photosensitizers available in the art may be used. The photosensitizer may be used alone or in a combination of two or more.

Examples of the photosensitizer may include an anthracene compound, a pyrene compound, a carbonyl compound, an organic sulfur compound, persulfide, a redox-based compound, azo and diazo compounds, a halogen compound, and photo reducing pigments. Two or more of these examples may be mixed together and used.

For example, the photosensitizer may include an anthracene compound represented by the following Formula 6; pyrene; benzoin derivatives such as benzoinmethylether, benzoinisopropylether, and α,α-dimethoxy-α-phenylacetophenone; benzophenone derivatives such as benzophenone, 2,4-dichlorobenzophenone, o-benzoylbenzoatemethyl, 4,4'-bis(dimethylamino)benzophenone, and 4,4'-bis(diethylamino)benzophenone; thioxanthone derivatives such as 2-chlorothioxanthone and 2-isopropyl thioxanthone; anthraquinone derivatives such as 2-chloroanthraquinone and 2-methylanthraquinone; acridine derivatives such as N-methylacridine and N-butylacridine; other α,α-diethoxyacetophenone, benzyl, fluorenone, xanthone, a uracil compound, and a halogen compound may be used.

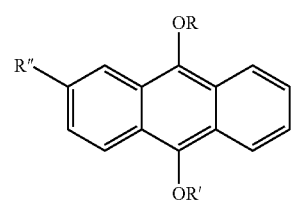

[Formula 6]

In Formula 6, R and R' each independently represent a linear alkyl group (e.g., having a linear shape) having 1 to 18 carbon atoms, a branched alkyl group (e.g., having a branched chain shape) having 1 to 18 carbon atoms, or cycloalkyl group (e.g., having a circular shape) having 3 to 18 carbon atoms, and an ether group having 2 to 18 carbon atoms. R" represents a hydrogen atom or a linear alkyl group (e.g., having a linear shape) having 1 to 18 carbon atoms, a branched alkyl group (e.g., having a branched chain shape) having 1 to 18 carbon atoms, or a cycloalkyl group (e.g., having a circular shape) having 3 to 18 carbon atoms.

In Formula 6, the linear alkyl group, the branched alkyl group or the cycloalkyl group having 1 to 18 carbon atoms (or 3 to 18 carbon atoms) are represented by R, R', and R", and may include, for example, methyl groups, ethyl groups, propyl groups, isopropyl groups, butyl groups, sec-butyl groups, tert-butyl groups, isobutyl groups, amyl groups, isoamyl groups, tert-amyl groups, n-hexyl groups, 2-hexyl groups, 3-hexyl groups, cyclohexyl groups, 1-methylcyclohexyl groups, n-heptyl groups, 2-heptyl groups, 3-heptyl groups, isoheptyl groups, tert-heptyl groups, n-octyl groups, isooctyl groups, tert-octyl groups, 2-ethylhexyl groups, nonyl groups, isononyl groups, decyl groups, dodecyl groups, tridecyl groups, tetradecyl groups, pentadecyl groups, hexadecyl groups, heptadecyl groups, or octadecyl groups. The ether groups having 2 to 18 carbon atoms are represented by R and R', and may include, for example, 2-methoxyethyl groups, 2-ethoxyethyl groups, 2-butoxyethyl groups, 2-phenoxyethyl groups, 2-(2-methoxyethoxy) ethyl groups, 3-methoxypropyl groups, 3-butoxypropyl groups, 3-phenoxypropyl groups, 2-methoxy-1-methylethyl groups, 2-methoxy-2-methylethyl group, 2-methoxyethyl groups, 2-ethoxyethyl groups, 2-butoxyethyl groups, and 2-phenoxyethyl groups. In the examples above, the term "ether group" refers to a hydrocarbon group having at least one ether, and includes alkoxyalkyl groups, alkoxyalkoxyalkyl groups, aryloxyalkyl groups, and/or the like.

Any suitable synthetic product or commercial product may be used as the photosensitizer. Examples of suitable commercial products may include Kayacure (registered trademark)-DMBI, BDMK, BP-100, BMBI, DETX-S, and EPA (each manufactured by Nippon Kayaku Co., Ltd.), Anthracure (registered trademark) UVS-1331 and UVS-1221 (each manufactured by Kawasaki Kasei Chemicals Ltd.), and Ebecryl P102, 103, 104, and 105 (each manufactured by UCB S.A.).

A usage amount (e.g., a total usage amount when the photopolymerization initiator and the photosensitizer are used together) of at least one of the photopolymerization initiator and the photosensitizer may be about 0.1 parts by weight to about 7 parts by weight about 0.5 parts by weight to about 2.5 parts by weight, or about 1.5 parts by weight to about 2.5 parts by weight, with respect to 100 parts by weight of a polymeric component ((A)+(B)+(C)). Within any of the above ranges, curing efficiency of the adhesive composition due to ultraviolet radiation may increase and a decrease in the adhesive property and durability of the adhesive composition (or of the film formed from the adhesive composition) due to the bleed out component may be prevented (or an amount or likelihood of such a decrease may be reduced).

The adhesive composition for a polarizing plate of the present invention may include (B) an epoxy group-containing compound; (D) a photoacid generator; and (E) at least one of a photopolymerization initiator and a photosensitizer, in addition to the above-described (A) polymerizable functional group-containing monomer capable of providing an anchor effect.

In an embodiment, the adhesive composition for a polarizing plate includes (A1) a polymerizable functional group-containing macromonomer at about 0.5 parts by weight to about 30 parts by weight, (B) an epoxy group-containing compound at about 40 parts by weight to about 99.5 parts by weight, and (C) a (meth)acrylic-based monomer at about 0 parts by weight to about 59.5 parts by weight, and may include (D) a photoacid generator at about 1 part by weight to about 7 parts by weight, and (E) at least one of a photopolymerization initiator and a photosensitizer at about 0.1 part by weight to about 7 parts by weight, with respect to 100 parts by weight of (A)+(B)+(C).

In another embodiment, the adhesive composition for a polarizing plate includes (A2) an allyl-group-and-hydroxyl-group-containing (meth)acrylate monomer in an amount of about 20 parts by weight to about 70 parts by weight, (B) an epoxy group-containing compound in an amount of about 20 parts by weight to about 80 parts by weight, and (C) a (meth)acrylic-based monomer in an amount of about 0 parts by weight to about 30 parts by weight, and may include (D) a photoacid generator in an amount of about 1 part by weight to about 7 parts by weight, and (E) at least one of a photopolymerization initiator and a photosensitizer in an amount of about 0.1 parts by weight to about 7 parts by weight, with respect to 100 parts by weight of (A)+(B)+(C).

In any of the above ranges, suitable initial curing, adhesive property, and durability may be achieved in the adhesive composition for a polarizing plate (or in the film formed from the adhesive composition).

In the adhesive composition for a polarizing plate of embodiments of the present invention, other components such as ultraviolet absorbing agents, antioxidants, thermal stabilizers, silane coupling agents, inorganic fillers, softening agents, anti-aging agents, stabilizers, tackifying resins, modified resins (such as polyol resins, phenol resins, acrylic resins, polyester resins, and polyolefin resins), leveling agents, defoaming agents, plasticizers, dyes, pigments (such as coloring pigments and body pigments), treatment agents, UV blocking agents, fluorescent brighteners, dispersing agents, light stabilizers, antistatic agents and lubricants may be added as desired.

[Manufacturing Method of Adhesive Composition]

A method of manufacturing the adhesive composition of embodiments of the present invention is not particularly limited. In general, the adhesive composition may be obtained by mixing the components described herein. In order to adjust viscosity, an organic solvent may be added as desired or appropriate. A mixing method is not particularly limited. For example, stirring and mixing may be suitably (or sufficiently) performed at room temperature (e.g., 25° C.) until the liquid is mixed (or homogenized).

(2) Adhesive Film for a Polarizing Plate

According to another aspect of an embodiment of the present invention, an adhesive film for a polarizing plate is formed using the adhesive composition for a polarizing plate of embodiments of the present invention. The adhesive film for a polarizing plate bonds the polarizer and the protective film and may provide a polarizing plate having good initial curing and good durability. The adhesive film for a polarizing plate of embodiments of the present invention may be manufactured by drying or curing the adhesive composition for a polarizing plate.

In order to obtain a uniform in-plane thickness and suitable (or sufficient) adhesive force, a thickness of the adhesive film for a polarizing plate may be appropriately adjusted. The thickness of the adhesive film may be, for example, about 500 nm to about 3 µm.

(3) Polarizing Plate

Figure 5:
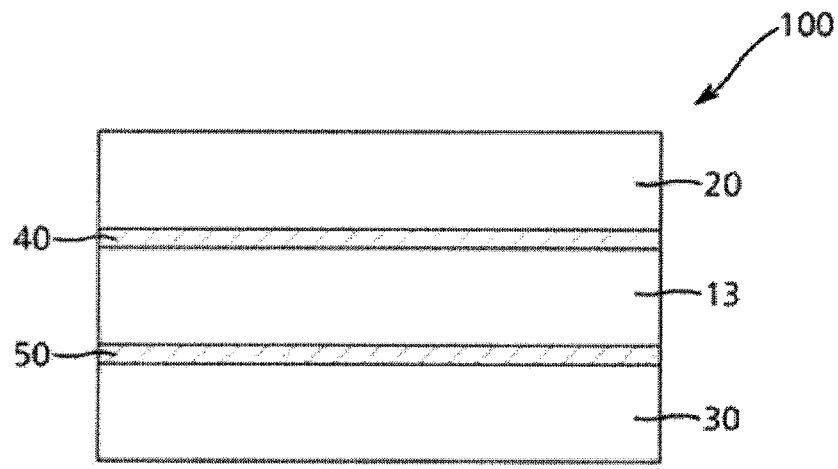
FIG. 5 is a cross sectional view of a polarizing plate of an embodiment of the present invention.

According to still another aspect of an embodiment of the present invention, there is provided a polarizing plate that is bonded using the adhesive composition for a polarizing plate of the present invention. The polarizing plate includes the protective film and the polarizer. The polarizing plate of embodiments of the present invention has good processability in manufacturing and a suitable (or sufficient) adhesive property. FIG. 5 is a cross sectional view of a polarizing plate according to an embodiment of the present invention. As illustrated in FIG. 5, a polarizing plate 100 of an example of the present invention may include a polarizer 13, a first adhesive film for a polarizing plate 40 on (or formed above) the polarizer 13, a first protective film 20 on (or formed above) the first adhesive film for a polarizing plate 40, a second adhesive film for a polarizing plate 50 below (or formed below) the polarizer 13, and a second protective film 30 below (or formed below) the second adhesive film for a polarizing plate 50. At least one of the first adhesive film for a polarizing plate 40 and the second adhesive film for a polarizing plate 50 may be made from the adhesive composition for a polarizing plate of embodiments of the present invention. Hereinafter, a configuration of the polarizing plate of an embodiment of the present invention will be described.

[Polarizer]

The polarizer is not particularly limited, and any suitable polarizers available in the art may be used. For example, the polarizer may include polyvinyl alcohol-based films, partially formalyzed polyvinyl alcohol-based films, and hydrophilic polymer films such as partially saponified ethylene-vinyl acetate copolymer films, which are adsorbed with dichroic materials such as iodine and dichroic dyes and uniaxially stretched, and polyene-based oriented films such as dehydrated polyvinyl alcohol materials or dehydrochlorided polyvinyl chloride materials.

In one embodiment, a polarizer manufactured such that a polyvinyl alcohol film having an average degree of polymerization of about 2000 to about 2800, and a degree of saponification of about 90 mol % to about 100 mol %, is dyed with iodine and is uniaxially stretched about five times to about six times to form the polarizer. For example, such a polarizer may be obtained by immersing, for example, a polyvinyl alcohol film in an aqueous iodine solution, dying, and stretching the film. For example, the film may be immersed in an aqueous iodine solution including about 0.1 wt % to about 1.0 wt % of iodine/potassium iodide. Optionally, the film may be immersed in an aqueous solution of boric acid, potassium iodide, or the like at about 50° C. to about 70° C. To clean or to prevent (or reduce) dying stains, the film may be immersed in water at about 25° C. to about 35° C. The stretching may be performed before, during, and/or after dying with iodine. After the dying and stretching are performed, the film is washed with water and dried at about 35° C. to 55° C. for about 1 minute to about 10 minutes.

[Protective Film]

As the protective film, a material having good transparency, mechanical strength, thermal stability, a moisture blocking property, isotropy, and/or the like may be used. For example, cellulose-based resins such as cellulose diacetate and cellulose triacetate, polyester-based resins such as polyethylene terephthalate and polyethylene naphthalate, acryl-based resins such as polymethacrylate, styrene-based resins such as polystyrene and acrylonitrile styrene copolymer (AS resin), polycarbonate-based resins, polyethylene, polypropylene, cyclo-based or norbornene-based polyolefins, polyolefin-based resins such as ethylene propylene copolymers, vinyl chloride-based resins, amide-based resins such as nylon and aromatic polyamide, imide-based resins, sulfone-based resins, polyethersulfone-based resins, polyetheretherketone-based resins, polyphenylenesulfide-based resins, vinyl alcohol-based resins, vinylidenechloride-based resins, vinylbutyral-based resins, arylate-based resins, polyoxymethylene-based resins, epoxy-based resins, or combinations of the resins may be used.

As described herein, the protective film for the polarizing plate may include a cellulose-based resin that is an ester of cellulose and a fatty acid, a cyclo olefin polymer (a COP film), polyethyleneterephthalate (a PET film), or the acryl-based resin. Examples of the cellulose-based resin may include cellulose triacetate (TAC film), cellulose diacetate, cellulose tripropionate, and cellulose dipropionate. Among them, the cellulose triacetate (TAC film) and the cyclo olefin polymer (COP film) are suitable in terms of easy availability and/or cost, and the acryl-based resin is suitable in terms of easy availability and/or moisture permeability. When the moisture permeability of the protective film is high, water penetrates into the protective film and enters the polarizer side more easily, which may decrease the quality of the polarizer. However, when the acryl-based resin is used, it is possible to substantially (or significantly) reduce the degradation of the polarizer that may otherwise result from the penetration of water into the protective film.

Also, the adhesive composition for a polarizing plate of an embodiment of the present invention includes (B) an epoxy group-containing compound in a predetermined (or set) range. In the (B) epoxy group-containing compound, the epoxy group-containing (meth)acrylate monomer dissolves acryl-based resins. Therefore, if an acryl-based resin is included in (or used as) the protective film and the polarizing plate is formed such that the protective film (e.g., the acryl-based resin) is adhered to either or both surfaces of the polarizer by way of the adhesive composition for a polarizing plate of an embodiment of the present invention, the adhesive composition (e.g., a polymer chain of the component (A) having a bulky structure) may penetrate into the protective film. Then, when the adhesive composition is cured by UV radiation, an anchor effect occurs (or arises) due to the penetration of the adhesive composition into the acryl-based resin and the adhesion strength of the film formed from the adhesive composition increases. Therefore, when the acryl-based resin is used as the protective film, for example, a macro monomer having a polymer chain of polymethacrylate (PMMA) is used as the component (A), because compatibility of the PMMA with the acryl-based resin is good and the anchor effect becomes stronger, thereby increasing the adhesive strength of the film formed from the adhesive composition.

Meanwhile, a network structure may be formed such that side chains are formed (or arranged) in a shape in which a polymer chain part of the macro monomer is grafted in (or entangled with) a main chain of the (B) epoxy group-containing compound and the polymerizable functional group of the macro monomer (also, the (C) other monomers may react together (or with one another) to form a network). Accordingly, the Tg of the film formed from the adhesive composition for a polarizing plate increases, an anchor structure of the acryl-based resin serving as the protective film is obtained (or achieved), and components of the adhesive composition form a complex network structure, thereby increasing the adhesive strength of the film formed from the adhesive composition.

Although the embodiments disclosed herein are believed to act or operate according to the mechanisms described, the scope of the present invention is not limited by any particular mechanism or theory.

Meanwhile, in the (B) epoxy group-containing compound, when the epoxy resin is used, the macromer and the other monomers may be combined. In this composition, the other monomers of the adhesive composition dissolve the surface of the protective film, the macromer component penetrates into the resin layer of the protective film, and then polymerization of the adhesive composition is performed by UV radiation. Also, the UV radiation causes the epoxy resins to polymerize with one another and the reaction product of the epoxy resins is physically entangled with a polymer of the macromer component. Because the polymerization is performed through such a process, side chains of the macro monomer that elongate from the entanglement enter the protective film and may provide the anchor effect. In this case, the initial curing and the adhesive property of the adhesive composition (or of the film formed from the adhesive composition) may increase.

Also, either of saponified cellulose triacetate and unsaponified cellulose triacetate may be used. The cyclo olefin polymer may include a polymer obtained by a hydrogenation reaction of an open-ring polymer of tetracyclododecyl as a component, examples of which are disclosed in Japanese Patent Application No. 2-9619, the entire content of which is incorporated herein by reference.

A commercial product of the acryl-based resin film may include acrylic film RT, SO, HI series manufactured by Kuraray Co., Ltd., and/or the like.

A commercial product of the TAC film may include UV-50, UV-80, SH-80, TD-80U, TD-TAC, and UZ-TAC manufactured by Fujifilm Co., Ltd. and KC series manufactured by Konica Minolta Opto Products Co., Ltd., and/or the like.

A commercial product of the COP film may include Arton (registered trademark) manufactured by JSR Corp. and Zeonex (registered trademark) series and Zeonor (registered trademark) series manufactured by Nippon Zeon Co., Ltd.

A commercial product of the PET film may include Cosmoshine (registered trademark) series manufactured by Toyobo Co., Ltd.

The surface of the protective film may be modified by a corona discharge treatment. The method of the corona discharge treatment is not particularly limited. A general corona discharge treatment device (for example, a device manufactured by Kasuga Electric Works Ltd.) may be used for the corona discharge treatment. When the corona discharge treatment is performed, an active group such as a hydroxyl group is formed at (or in) the surface of the protective film, which may further contribute to an increase in the adhesive property of the adhesive composition (or of the film formed from the adhesive composition). When the saponified cellulose triacetate is used as the protective film, even though an increase in the adhesive property of the adhesive composition (or of the film formed from the adhesive composition) may be expected from the corona discharge treatment, the corona discharge treatment is not necessarily required. However, because the saponification treatment may be expensive due to using a complex process, when the unsaponified cellulose is treated by the corona discharge treatment and is used, it may reduce the costs of the manufacturing process.

The discharge amount in the corona discharge treatment is not particularly limited, and may be about 30 W·min/m² to about 300 W·min/m², or about 50 W·min/m² to about 250 W·min/m². Within any of the above ranges, it is possible to increase the adhesive property of the protective film and the adhesive composition (or of the film formed from the adhesive composition) without degrading the protective film itself. Here, the discharge amount is the working amount of an object by corona discharge obtained by the following calculation. Corona discharge power is determined based on the discharge amount.

Discharge amount=discharge power÷[(object treatment rate)×(electrode length)][Manufacturing method of polarizing plate]

The manufacturing method of the polarizing plate is not particularly limited, and the polarizing plate may be manufactured by bonding the protective film and the polarizer using the adhesive composition of an embodiment of the present invention according to any suitable methods available in the art. The applied adhesive composition has a good adhesive property due to the ultraviolet radiation and forms an adhesive layer.

The adhesive composition may be applied to either or both of the protective film and the polarizer. The adhesive composition may be applied such that the thickness of the dried (or cured) adhesive layer is about 10 nm to about 5 μm. The thickness of the adhesive layer is, for example, about 500 nm to about 3 μm in order to obtain a uniform in-plane thickness and suitable (or sufficient) adhesive force. The thickness of the adhesive layer may be adjusted (or controlled) by the solids concentration of the solution of the adhesive composition or the coating device of the adhesive composition. Also, the thickness of the adhesive layer may be determined by observing a cross section of the adhesive layer (or film) using a scanning electron microscope (SEM). A method of applying the adhesive composition is not particularly limited, and various suitable methods may be used, for example, a method of directly dropping the adhesive composition, a roll coating method, a spraying method, and/or an immersing method.

After the adhesive composition is applied, the polarizer and the protective film are bonded together by a roll laminator, and/or the like.

After bonding, ultraviolet light is irradiated onto the polarizing plate in order to cure the adhesive composition. A light source of the ultraviolet light is not particularly limited, but examples thereof include a low pressure mercury lamp, a medium pressure mercury lamp, a high pressure mercury lamp, an ultrahigh pressure mercury lamp, a chemical lamp, a blank light lamp, a microwave excited mercury lamp, a metal halide lamp, and/or the like, which have a light emission distribution below a wavelength of 400 nm. An amount of the ultraviolet radiation is not particularly limited, but the amount of the ultraviolet radiation of a wavelength range that is effective for activation of the polymerization initiator may be about 100 mJ/cm² to about 2000 mJ/cm². Within this range, because the reaction time is suitable (or appropriate), even though heat is radiated from the lamp and heat is generated during polymerization, there is little concern about degradation of the adhesive itself or the polarizing film due to the heat generated during polymerization.

After ultraviolet radiation, because a dark reaction is performed on the epoxy resin, the polarizing plate is maintained at room temperature (e.g., 23° C.) for about 16 hours to about 30 hours immediately after (or substantially immediately after) ultraviolet radiation. The polarizing plate is completed by completion of the curing reaction.

(4) Display Device

Next, embodiments of the display device will be further described. The display device according to an embodiment of the present invention may include the polarizing plate of an embodiment of the present invention. The display device may include a liquid crystal display device, an organic light-emitting element display device, and/or the like.

EXAMPLES

Hereinafter, embodiments of the present invention will be described with reference to some Examples and Comparative Examples. However, these Examples and Comparative Examples are presented for illustrative purposes only and do not limit the scope of the present invention.

Examples 1 to 30

<Preparation of Adhesive Composition>

According to the mixing amounts shown in Tables 1 to 6, the components shown in Tables 1 to 6 were stirred and mixed at a constant (or substantially constant) room temperature of 23° C. and a relative humidity (RH) of 50% until the components were fully mixed (or homogenized) as determined by the naked eye. Thereby, the adhesive compositions of Examples 1 to 30 and Comparative Examples 1 to 6 were obtained. In addition, a unit of the adhesive composition shown in Tables 1 to 6 is referred to as "g."

<Manufacture of Polarizing Plate>

A polarizer was manufactured by the following method. A polyvinyl alcohol film having an average degree of polymerization of 2400, a degree of saponification of 99.9%, and a thickness of 75 μm was immersed and swollen in hot water at 28° C. for 90 seconds, and then immersed in an aqueous solution having a concentration of 0.6 wt % of iodine/potassium iodide (at a weight ratio of 2/3). The polyvinyl alcohol film was stretched 2.1 times (e.g., stretched to a length 2.1 times as long as the initial length), and the polyvinyl alcohol film was dyed. Then, stretching was performed in a boric acid ester aqueous solution at 60° C. such that a stretch ratio in total becomes 5.8 times (e.g., the polyvinyl alcohol film was stretched to a length 5.8 times as long as the initial length). After washing with water, a drying process was performed at 45° C. for 3 minutes, and the polarizer (having a thickness of 25 μm) was manufactured.

FIG. 1 is a diagram schematically illustrating the process of manufacturing the polarizing plate 5 according to the present example. As illustrated in FIG. 1, a polarizer 1 was arranged between a protective film 3 and a protective film 4, a suitable (or appropriate) amount of an adhesive composition 2 obtained as described above was dropped between the protective film 3 and the polarizer 1 and between the protective film 4 and the polarizer 1 using a syringe, and bonding was performed by a roll press having rolls 6 and 7.

In Examples 1 to 13, 16 to 25, and 29 to 30 and Comparative Examples 1 to 5, a cyclic olefin polymer (COP) film (a Nippon Zeon Co., Ltd. product having a thickness of 30 μm) was used as the protective film 3, and an acrylic film (a Kuraray Co., Ltd. product having a thickness of 75 μm) was used as the protective film 4.

In Examples 14 to 15 and 26 to 28, the COP film (a Nippon Zeon Co., Ltd. product having a thickness of 30 μm) was used as the protective film 3, and a cellulose triacetate film (a TAC film, a Fujifilm Co., Ltd. product having a thickness of 80 μm) was used as the protective film 4.

In the polarizing plate 5 bonded in this manner before ultraviolet irradiation, ultraviolet light having a radiation amount of 1000 mJ/cm$^2$ (using a metal halide lamp producing a wavelength of 365 nm) is irradiated onto the protective film 3 side. Also, after a process of bonding the polarizer and the protective film using the adhesive composition, ultraviolet irradiation was performed at a relative humidity (RH) of 50% and a temperature of 23° C.

After ultraviolet irradiation, the polarizing plate was maintained at a constant (or substantially constant) room temperature of 23° C. and a relative humidity (RH) of 50% for 24 hours, the adhesive composition was cured, and the polarizing plate was completed. A thickness of the adhesive layer in the completed polarizing plate was 2.0 μm.

As will be described further below, an initial curing test was performed on the polarizing plates obtained in the Examples and Comparative Examples immediately after (or substantially immediately after) ultraviolet irradiation. After further ultraviolet irradiation was performed, the polarizing plate was maintained at room temperature (e.g., 23° C.) for 24 hours, and a cut test and a hot water immersion test were performed for evaluation.

<Initial Curing Test>

Figure 2:
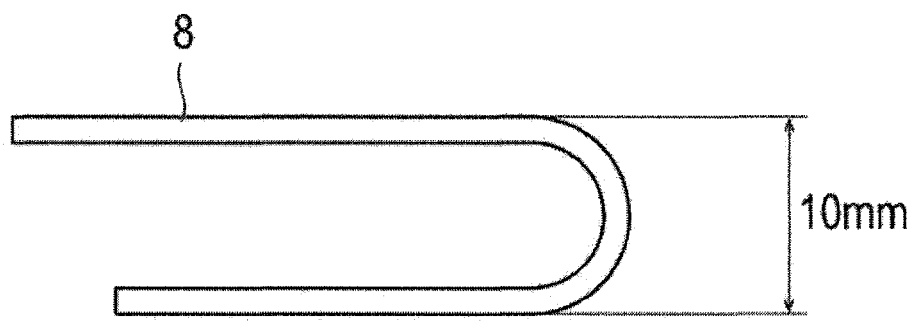
FIG. 2 is a diagram schematically illustrating a method of an initial curing test of an example.

As illustrated in FIG. 2, immediately after (or substantially immediately after) ultraviolet irradiation, the polarizing plates manufactured in Examples 1 to 30 and Comparative Examples 1 to 6 were bent such that the interval of bends in the polarizing plate 8 is 10 mm (R10 mm), and it was determined with the naked eye whether or not the protective film detached from the polarizer. When no detachment was observed, it was recorded as "○", or otherwise, if detachment was observed, it was recorded as "x." Tables 1 to 6 show the evaluation results.

<Cut Test>

The polarizing plates manufactured in Examples 1 to 30 and Comparative Examples 1 to 6 were cut to a size of 50 mm×50 mm using a Thompson knife, and an exfoliation state of an end during cutting was observed with the naked eye. As an evaluation criterion, 0.5 mm or less exfoliation was accepted as a success. Tables 1 to 3 show the evaluation results. A suitable cut result is 0.3 mm or less, 0.2 mm or less, or 0 mm.

<Hot Water Immersion Test>

Figure 3:
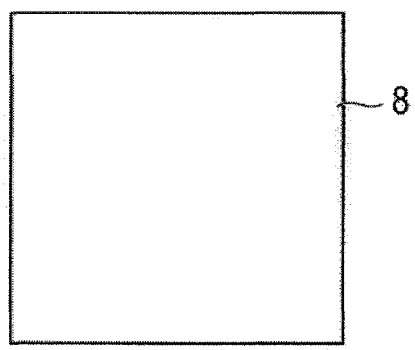
FIG. 3 is a diagram schematically illustrating a method of a hot water immersion test of an example.
Figure 3:
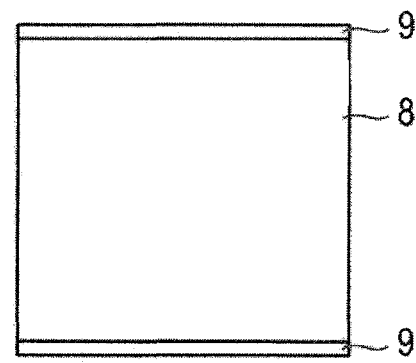

The polarizing plates manufactured in Examples 1 to 30 and Comparative Example 1 to 6 were cut to a size of 50 mm×50 mm using the Thompson knife, and immersed and maintained in a water tank at 60° C. for 2 hours. Then, each sample was taken out from the water tank, and a size of shrinkage of the polarizer was measured. A shrinkage size 9 was obtained by measuring a size from an end of the polarizing plate 8 before the test as illustrated in FIG. 3A to an end of the polarizing plate 8 that has shrank in a stretching direction as illustrated in FIG. 3B. When the adhesive property of the adhesive composition is high, the shrinkage has a small value. When the adhesive property of the adhesive composition is low (or insufficient), the shrinkage of the polarizing plate has a great (or large) value. As an evaluation criterion, a size of shrinkage of less than 1.0 mm was accepted as a success. Table 1 shows the evaluation results. A suitable shrinkage result is 0.5 mm or less, 0.2 mm or less, or 0 mm.

<Peel Strength>

Figure 4:
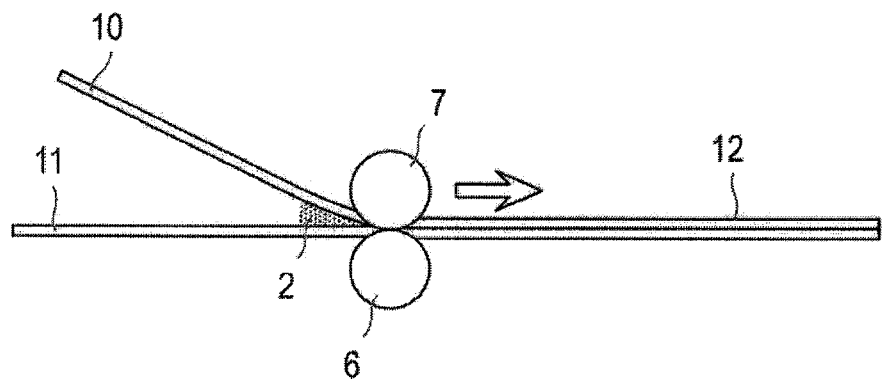
FIG. 4 is a diagram schematically illustrating a method of a peel strength test of an example.

FIG. 4 is a diagram schematically illustrating a method of manufacturing a specimen 12 for a peel strength measurement. As illustrated in FIG. 4, an appropriate amount of the adhesive composition 2 obtained as described above was dropped between a PET film 10 and an acrylic film 11 using a syringe, and bonding was performed by the roll press having rolls 6 and 7. Also, in the PET film and the acrylic film, a corona treatment was performed on each adhesive surface.

In the peel strength measurement specimen 12 bonded in this manner before ultraviolet irradiation, ultraviolet light of a radiation amount of 1000 mJ/cm$^2$ (using a metal halide lamp producing a wavelength of 365 nm) was irradiated onto the PET film 10. Also, a process of bonding the PET film and the acrylic film using the adhesive composition to ultraviolet irradiation was performed at a relative humidity (RH) of 50% and a temperature of 23° C.

After ultraviolet irradiation, the peel strength measurement specimen was maintained in a constant (or substantially constant) temperature room (having a temperature of 23° C. and a relative humidity (RH) of 50%) for 24 hours, the adhesive composition was cured, and the polarizing plate was completed. A thickness of the adhesive layer in the completed polarizing plate was 2.0 μm.

The peel strength measurement specimen was cut to a size of 150 mm×25 mm (width×height), the acrylic film side was fixed to an SUS stainless steel plate using a double-sided tape, a tensile tester was used to peel the PET film 10 at a peel angle of 90° and a peel rate of 10 mm/min, and the peel strength was measured.

TABLE 1

|  |  | Example 1 | Example 2 | Example 3 | Example 4 | Example 5 | Example 6 | Example 7 | Example 8 |
|---|---|---|---|---|---|---|---|---|---|
| Macromer (A1) | AA-6 | 1 | 10 | 20 | — | — | 10 | — | — |
|  | AS-6 | — | — | — | 10 | — | — | 10 | — |
|  | AB-6 | — | — | — | — | 10 | — | — | 10 |
| Epoxy group and (meth)acrylate group-containing monomer (B) | 4HBAGE | 99 | 90 | 80 | 90 | 90 | — | — | — |
|  | M100 | — | — | — | — | — | 90 | 90 | 90 |
| Acrylmonomer (C) | 4HBA | — | — | — | — | — | — | — | — |
|  | POA | — | — | — | — | — | — | — | — |
| Epoxy resin (B) | 830CRP | — | — | — | — | — | — | — | — |
| Photoacid generator (D) | CP1210S | 3 | 3 | 3 | 3 | 3 | 3 | 3 | 3 |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Photoinitiator (E) | Ig907 | 1 | 1 | 1 | 1 | 1 | 1 | 1 | 1 |
| Photosensitizer (E) | DETX-S | — | — | — | — | — | — | — | — |
| Film composition |  | acryl/COP | acryl/COP | acryl/COP | acryl/COP | acryl/COP | acryl/COP | acryl/COP | acryl/COP |
| Initial curing |  | ○ | ○ | ○ | ○ | ○ | ○ | ○ | ○ |
| Cut test (mm) |  | 0.2 | 0.0 | 0.0 | 0.0 | 0.5 | 0.0 | 0.2 | 0.5 |
| Hot water test (mm) |  | 0.2 | 0.0 | 0.0 | 0.0 | 0.5 | 0.0 | 0.2 | 0.5 |
| Peel strength (N/25 mm) |  | 6 | 10 | 8 | 10 | 6 | 8 | 8 | 5 |

TABLE 2

|  |  | Example 9 | Example 10 | Example 11 | Example 12 | Example 13 | Example 14 | Example 15 | Example 16 | Example 17 |
|---|---|---|---|---|---|---|---|---|---|---|
| Macromer (A1) | AA-6 | 10 | 10 | 10 | 10 | 10 | 1 | 10 | 35 | 35 |
|  | AS-6 | — | — | — | — | — | — | — | — | — |
|  | AB-6 | — | — | — | — | — | — | — | — | — |
| Epoxy group and (meth)acrylate group-containing monomer (B) | 4HBAGE | 90 | 80 | 80 | 70 | — | 99 | 90 | 65 | — |
|  | M100 | — | — | — | — | — | — | — | — | — |
| Acryl monomer (C) | 4HBA | — | 10 | — | — | 30 | — | — | — | 10 |
|  | POA | — | — | — | — | 20 | — | — | — | 35 |
| Epoxy resin (B) | 830CRP | — | — | 10 | 20 | 40 | — | — | — | 20 |
| Photoacid generator (D) | CP1210S | 3 | 3 | 3 | 3 | 3 | 3 | 3 | 3 | 3 |
| Photoinitiator (E) | Ig907 | — | 1 | 1 | 1 | 1 | 1 | 1 | 1 | 1 |
| Photosensitizer (E) | DETX-S | 1 | — | — | — | — | — | — | — | — |
| Film composition |  | acryl/COP | acryl/COP | acryl/COP | acryl/COP | acryl/COP | acryl/COP | acryl/COP | acryl/COP | acryl/COP |
| Initial curing |  | ○ | ○ | ○ | ○ | ○ | ○ | ○ | ○ | ○ |
| Cut test (mm) |  | 0.0 | 0.0 | 0.0 | 0.0 | 0.0 | 0.0 | 0.0 | 2.0 | 2.0 |
| Hot water test (mm) |  | 0.0 | 0.2 | 0.0 | 0.0 | 0.2 | 0.1 | 0.0 | 2.5 | 3.0 |
| Peel strength (N/25 mm) |  | 11 | 6 | 6.5 | 7 | 5 | 8 | 13 | 1.0 | 0.5 |

TABLE 3

|  |  | Example 18 | Example 19 | Example 20 | Example 21 | Example 22 | Example 23 |
|---|---|---|---|---|---|---|---|
| Allyl-group-and-hydroxyl-group-containing acrylate (A2) | ALHA | 70 | 50 | 23 | 30 | 30 | 50 |
| Epoxy resin (B) | 830CRP | 30 | 50 | 77 | 70 | — | 50 |
|  | 2021P | — | — | — | — | 70 | — |
| Acrylate (C) | POA | — | — | — | — | — | — |
|  | 4HBA | — | — | — | — | — | — |
| Photoacid generator (D) | CPI210S | 3 | 3 | 3 | 3 | 3 | 3 |
| Photopolymerization initiator (E) | Ig 907 | 1 | 1 | 1 | 1 | 1 | — |
| Photosensitizer (E) | DETX-S | — | — | — | — | — | 1 |
| Film composition |  | acryl/COP | acryl/COP | acryl/COP | acryl/COP | acryl/COP | acryl/COP |
| Initial curing test |  | ○ | ○ | ○ | ○ | ○ | ○ |
| Cut test (mm) |  | 0.2 | 0.0 | 0.2 | 0.2 | 0.2 | 0.0 |
| Hot water immersion test (mm) |  | 0.2 | 0.0 | 0.2 | 0.2 | 0.2 | 0.0 |
| Peel strength (N/25 mm) |  | 5.0 | 12 | 7.0 | 9.0 | 10 | 13 |

TABLE 4

|  |  | Example 24 | Example 25 | Example 26 | Example 27 | Example 28 | Example 29 | Example 30 |
|---|---|---|---|---|---|---|---|---|
| Allyl-group-and-hydroxyl-group-containing acrylate (A2) | ALHA | 30 | 50 | 70 | 50 | 23 | 75 | 19 |
| Epoxy resin (B) | 830CRP | 50 | 30 | 30 | 50 | 77 | 15 | 81 |
|  | 2021P | — | — | — | — | — | — | — |
| Acrylate (C) | POA | 20 | 20 | — | — | — | — | — |
|  | 4HBA | — | — | — | — | — | 10 | — |
| Photoacid generator (D) | CPI210S | 3 | 3 | 3 | 3 | 3 | 3 | 3 |
| Photopolymerization initiator (E) | Ig 907 | — | 1 | 1 | 1 | 1 | 1 | 1 |
| Photosensitizer (E) | DETX-S | 1 | — | — | — | — | — | — |
| Film composition |  | acryl/COP | acryl/COP | TAC/COP | TAC/COP | TAC/COP | acryl/COP | acryl/COP |
| Initial curing test |  | ○ | ○ | ○ | ○ | ○ | ○ | ○ |
| Cut test (mm) |  | 0.0 | 0.0 | 0.0 | 0.0 | 0.0 | 1.0 | 1.0 |
| Hot water immersion test (mm) |  | 0.0 | 0.0 | 0.0 | 0.0 | 0.0 | 2.5 | 1.0 |
| Peel strength (N/25 mm) |  | 9.0 | 10 | 8.0 | 18 | 10 | 1.5 | 4.0 |

TABLE 5

|  |  | Comparative Example 1 | Comparative Example 2 | Comparative Example 3 | Comparative Example 4 |
|---|---|---|---|---|---|
| Macromer (A1) | AA-6 | — | — | — | — |
|  | AS-6 | — | — | — | — |
|  | AB-6 | — | — | — | — |
| Epoxy-group-and-(meth)acrylate-group containing monomer (B) | 4HBAGE | 100 | 90 | — | — |
|  | M100 | — | — | 40 | 90 |
| Acrylmonomer (C) | 4HBA | — | 10 | 40 | 10 |
|  | POA | — | — | 20 | — |
| Epoxy resin (B) | 830CRP | — | — | — | — |
| Photoacid generator (D) | CP1210S | 3 | 3 | 3 | 3 |
| Photoinitiator (E) | Ig907 | — | 1 | 1 | 1 |
| Photosensitizer (E) | DETX-S | 1 | — | — | — |
| Film composition |  | acryl/COP | acryl/COP | acryl/COP | acryl/COP |
| Initial curing |  | ○ | ○ | ○ | ○ |
| Cut test (mm) |  | 0.6 | 1.0 | 2.0 | 2.0 |
| Hot water test (mm) |  | 0.7 | 1.5 | 2.3 | 2.5 |
| Peel strength (N/25 mm) |  | 3 | 1.5 | 1.0 | 0.8 |

TABLE 6

|  |  | Comparative Example 5 | Comparative Example 6 |
|---|---|---|---|
| Allyl-group-and-hydroxyl-group-containing acrylate (A2) | ALHA | 100 | — |
| Epoxy resin (B) | 830CRP | — | — |
|  | 2021P | — | 30 |
| Acrylate (C) | POA | — | — |
|  | 4HBA | — | 70 |
| Photoacid generator (D) | CPI210S | 3 | 3 |
| Photopolymerization initiator (E) | Ig 907 | 1 | 1 |
| Photosensitizer (E) | DETX-S | — | — |
| Film composition |  | acryl/COP | acryl/COP |
| Initial curing test |  | ○ | ○ |
| Cut test (mm) |  | 1.5 | 1.0 |
| Hot water immersion test (mm) |  | 3.0 | 2.0 |
| Peel strength (N/25 mm) |  | 2.0 | 0.8 |

In the above-described Examples and Comparative Examples, the commercially available products were manufactured by or obtained from the following sources:
ALHA: Osaka Organic Chemical Industry Ltd. ALHA
2021P: Daicel Corp. Celloxide 2021P
830CRP: DIC Corp. Epiclon EXA-830CRP
POA: Kyoei Chemical Co., Ltd. POA phenoxyethylacrylate
AA-6: Toagosei Co., Ltd. macromer AA-6
AS-6: Toagosei Co., Ltd. macromer AS-6
AB-6: Toagosei Co., Ltd. macromer AB-6
4HBAGE: Nippon Kasei Chemical Co., Ltd.

M-100: Daicel Corp.Cyclomer M-100
4HBA: 4-hydroxybutyl acrylate
POA: Kyoei Chemical Co., Ltd. POA phenoxyethyl acrylate
830CRP: D1C Corp. Epiclon EXA-830CRP
CP1210: San-Apro Ltd. CP1-210
Ig907: BASF Co., Ltd IRGACURE 907
DETX-S: Nippon Kayaku Co., Ltd. DETX-S
Acrylic film: Kuraray Co., Ltd.
TAC film: Fujifilm Co., Ltd.
COP film: Nippon Zeon Co., Ltd.

As shown in Tables 1 to 4, Examples 1 to 15 and 18 to 28 showed good results in the peel strength test, the cut test, the hot water immersion test, and the initial curing test. However, Examples 16, 17, 29, and 30 showed good results in the initial curing test, and showed lower result values in the peel strength test, the cut test, and the hot water immersion test than Examples 1 to 15 and 18 to 28.

On the other hand, Comparative Examples 1 to 6 showed results in the peel strength test and the cut test which did not satisfy (or meet) the evaluation criterion, and showed lower result values in the hot water immersion test and the adhesive property than the Examples.

As described above, from the comparative results of the Examples and Comparative Examples, when the adhesive composition of embodiments of the present invention is used for the polarizing plate, it may be seen that good initial curing and an adhesive property may be balanced. In particular, because the adhesive composition used in Comparative Example 6 does not have a complicatedly tangled network structure (e.g., an interpenetrating network) as in the adhesive composition of embodiments of the present invention, it is considered that a suitable (or desired) adhesive property of embodiments of the present invention may not be obtained. That is, because only a linear structure is obtained in Comparative Example 6, a suitable (or desired) adhesive property of embodiments of the present invention may not be obtained. Also, because the TAC film includes an OH group, it has a higher polarity than the acrylic film. Therefore, it is suggested that the TAC film is more easily bonded as compared to the acrylic film.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof. As used herein, unless otherwise expressly specified, all numbers such as those expressing values, ranges, amounts or percentages may be read as if prefaced by the word "about," even if the term does not expressly appear. As used herein, the term "about" is used as a term of approximation and not a term of degree. Further, use of the word "about" reflects the penumbra of variation associated with measurement, significant figures, and interchangeability, all as understood by a person having ordinary skill in the art to which this disclosure pertains.

What is claimed is:

1. An adhesive composition for a polarizing plate, comprising:
   (A) a polymerizable functional group-containing monomer capable of providing an anchor effect comprising (A1) a polymerizable functional group-containing macromonomer;
   (B) an epoxy group-containing compound comprising a (meth)acrylate having one epoxy group;
   (C) optionally, a (meth)acrylic-based monomer;
   (D) a photoacid generator; and
   (E) at least one chosen from a photopolymerization initiator and a photosensitizer,
   wherein the adhesive composition comprises (A1) the polymerizable functional group-containing macromonomer in an amount of about 0.5 parts by weight to about 30 parts by weight, with respect to 100 parts by weight of (A)+(B)+(C), and (B) the epoxy group-containing compound in an amount of about 40 parts by weight to about 99.5 parts by weight with respect to 100 parts by weight of (A)+(B)+(C).

2. The adhesive composition of claim 1, wherein the adhesive composition comprises (A1) the polymerizable functional group-containing macromonomer in an amount of about 0.5 parts by weight to about 30 parts by weight, (B) the epoxy group-containing compound in an amount of about 40 parts by weight to about 99.5 parts by weight, (C) the (meth)acrylic-based monomer in an amount of about 0 parts by weight to about 59.5 parts by weight, (D) the photoacid generator in an amount of about 1 part by weight to about 7 parts by weight, and (E) the at least one of the photopolymerization initiator and the photosensitizer in an amount of about 0.1 parts by weight to about 7 parts by weight, with respect to 100 parts by weight of (A)+(B)+(C).

3. The adhesive composition of claim 1, wherein the (A1) polymerizable functional group-containing macromonomer is included in an amount of about 8 parts by weight to about 15 parts by weight, with respect to 100 parts by weight of (A)+(B)+(C).

4. The adhesive composition of claim 1, wherein the (A1) polymerizable functional group-containing macromonomer comprises a monomer represented by Formula 1:

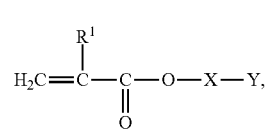

[Formula 1]

wherein, $R^1$ represents a hydrogen atom or a methyl group, X represents a monovalent or bivalent bonding group, Y represents a polymer chain formed by homopolymerization or copolymerization of one or more monomers selected from alkyl(meth)acrylate, stearyl(meth)acrylate, styrene, (meth)acrylonitrile, hydroxy(meth)acrylate, and silicone.

5. The adhesive composition of claim 4, wherein X is represented by any of Formulas 2 to 5:

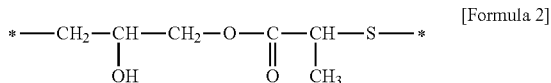

[Formula 2]

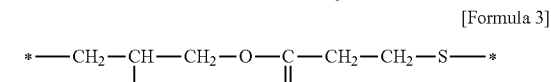

[Formula 3]

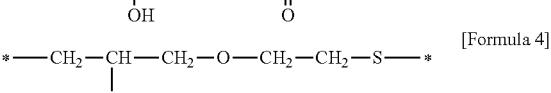

[Formula 4]

[Formula 5]

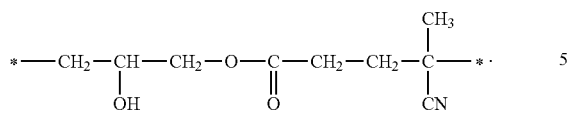

6. The adhesive composition of claim 1, wherein (C) comprises a hydroxyl group-containing (meth)acryl monomer, an aromatic ring-containing (meth)acrylate monomer, an alicyclic-containing (meth)acrylate monomer or a heterocyclic ring-containing (meth)acrylate monomer.

7. The adhesive composition of claim 1, wherein (C) comprises a mixture of a hydroxyl group-containing (meth)acryl monomer and an aromatic ring-containing (meth)acrylate monomer.

8. The adhesive composition of claim 1, wherein (B) comprises at least one of a (meth)acrylate having one epoxy group and an epoxy resin having two epoxy groups.

9. An adhesive film for a polarizing plate formed from the adhesive composition according to claim 1.

10. A polarizing plate comprising a protective film and a polarizer bonded together using the adhesive composition according to claim 1.

11. The polarizing plate of claim 10, wherein the protective film comprises an acrylic film, a cellulose-based film, or a cycloolefin polymer film.

12. A display device comprising the polarizing plate of claim 10.

* * * * *